(12) United States Patent
Nayyer

(10) Patent No.: US 8,131,124 B2
(45) Date of Patent: Mar. 6, 2012

(54) OPTICAL GUIDED MODE SPATIAL SWITCHES AND THEIR FABRICATION

(76) Inventor: Jamshid Nayyer, Toronto (CA)

( * ) Notice: Subject to any disclaimer, the term of this patent is extended or adjusted under 35 U.S.C. 154(b) by 183 days.

(21) Appl. No.: 12/400,882

(22) Filed: Mar. 10, 2009

(65) Prior Publication Data

US 2009/0263068 A1    Oct. 22, 2009

Related U.S. Application Data

(60) Provisional application No. 61/124,998, filed on Apr. 22, 2008.

(51) Int. Cl.
   *G02B 6/26* (2006.01)
(52) U.S. Cl. .................. 385/22; 385/16; 385/21; 385/40
(58) Field of Classification Search .......................... None
   See application file for complete search history.

(56) References Cited

U.S. PATENT DOCUMENTS

| | | | | |
|---|---|---|---|---|
| 4,145,109 | A * | 3/1979 | Nelson | 385/40 |
| 5,058,972 | A * | 10/1991 | Erman et al. | 385/17 |
| 5,369,718 | A * | 11/1994 | Kamata et al. | 385/21 |
| 5,388,170 | A * | 2/1995 | Heismann et al. | 385/4 |
| 5,594,818 | A * | 1/1997 | Murphy | 385/8 |
| 6,064,787 | A * | 5/2000 | Castoldi | 385/41 |
| 6,222,966 | B1 * | 4/2001 | Khan et al. | 385/45 |
| 6,633,692 | B2 | 10/2003 | Chua et al. | |
| 6,668,103 | B2 * | 12/2003 | Hosoi | 385/2 |
| 6,711,323 | B1 | 3/2004 | Nayyer | |
| 7,200,290 | B2 | 4/2007 | Morio et al. | |
| 2001/0046341 | A1 * | 11/2001 | Nakabayashi | 385/14 |
| 2002/0085791 | A1 * | 7/2002 | Kim | 385/16 |
| 2006/0062529 | A1 * | 3/2006 | Maki | 385/100 |

FOREIGN PATENT DOCUMENTS

| GB | 2227854 A | * | 8/1990 |
|---|---|---|---|
| JP | 5173197 | | 7/1993 |
| JP | 6-194696 A | * | 7/1994 |

OTHER PUBLICATIONS

W Yuan et al, "hybrid integrated cascaded 2-bit electrooptic digital optical switches (DOSs)", IEEE Photonics Technology ILetters, vol. 19, No. 7, pp. 519-521, Apr. 2007.
T. Kawaguchi, "PLZT thin-film waveguides" Applied Optics, vol. 23, No. 13, pp. 2187-2191, Jul. 1, 1984.

(Continued)

*Primary Examiner* — Mike Stahl
(74) *Attorney, Agent, or Firm* — Mark Clodfelter

(57) ABSTRACT

Optical guided mode fast 1×2 and 2×2 spatial switches are provided that can be used in multimedia communication networks. These switches require a relative refractive index change of only 0.0001~0.0002 and can be realized using Lithium Niobate, Polymers, semiconductors, etc. Extinction ratios of these switches are made to be better than 45 dB, by introductions of a rear edge adjusted broken electrode and a blocker electrode into their architecture. Optical losses are less than 3 dB, and excellent switching characteristics are achieved by suppressing cross talk to ~50 dB. The two output ports of the 1×2 (2×2) switch are made to be spatially perpendicular (in opposition) by introduction of air grooves, allowing for two-dimensional integration of unit switches into matrices. System applications of the switch are made flexible due to a discrete drive requirement for each optical input to the 2×2 switch.

17 Claims, 27 Drawing Sheets

TOP VIEW

OTHER PUBLICATIONS

J. Nayyer et al, "Anal;ysis of reflection-type opticla switches with intersecting waveguides", Journal of Lightwave Technology, vol. 6 No. 6, pp. 1146-1152, Jun. 1988.

J. Nayyer et al, "Optical intersecting-waveguide switches with widened angle of deflection", IEEE Photonics Technology Letters, vol. 4, No. 12, pp. 1375-1377, Dec. 1992.

B. Li et al, "Reflection-type optical waveguide switch with bow-tie electrode", Journal of Lightwave Technology vol. 20 No. 1,pp. 65-70, Jan. 2002.

W.D. Zhong et.al., "Multiwavelength cross-connects for optical transport networks", Journal of Lightwave Technology, vol. 14, No. 7, pp. 1613-1619, 1996.

J. Gripp, et.al, "Optical switch fabrics for ultra-high-capacity IP routers", Journal of Lightwave Technology, vol. 21, No. 11, pp. 2839-2850, Nov. 2003.

R.S. Tucker, "The Role of Optics and Electronics in High Capacity Routers" Journal of Lightwave Technology, vol. 24, No. 12, pp. 4655-4673, Dec. 2006.

A. Misawa et.al. A Prototype Broadcast-and-Select photonic ATM Switch with a WDM Output Buffer, Journal of Lightwave Technology, vol. 16. No. 12, pp. 2202-2211, 1998.

S. Johansson, "Transport network involving a reconfigurable WDM network layer—A European Demonstration", Journal of Lightwave Technology, vol. 14, No. 6, pp. 1341-1348. 1996.

R. Krahenbuhl et.al. "performance and modeling of advanced Ti:LiNbO3 digital optical switches", Journal of Lightwave Technology, vol. 20, No. 1, pp. 92-99, Jan. 2002.

M.P. Earnshaw et al, "semiconductor space switches based on multimode interference couplers", Journal of Lightwave Technology, vol. 20, No. 4, pp. 643-650, Apr. 2002.

T. Kirihara et al, "lossless and low crosstalk characteriwstics in an InP based 2×2 optical switch" IEEE Photonics Technology letters, vol. 5 No. 9, pp. 1059-1061, Sep. 1993.

M. Born and E. Wolf, Principles of Optics, 6th ed., London, UK , Pergamon, 1989, pp. 64-70.

R.E.A. Saleh et al, "fundamentals of photonics", John Wiley and Sons, inc. 1991, ch. 18, sec. 18.1.

\* cited by examiner

TOP VIEW

DRIVE REQUIREMENTS OF 1X2 SWITCH

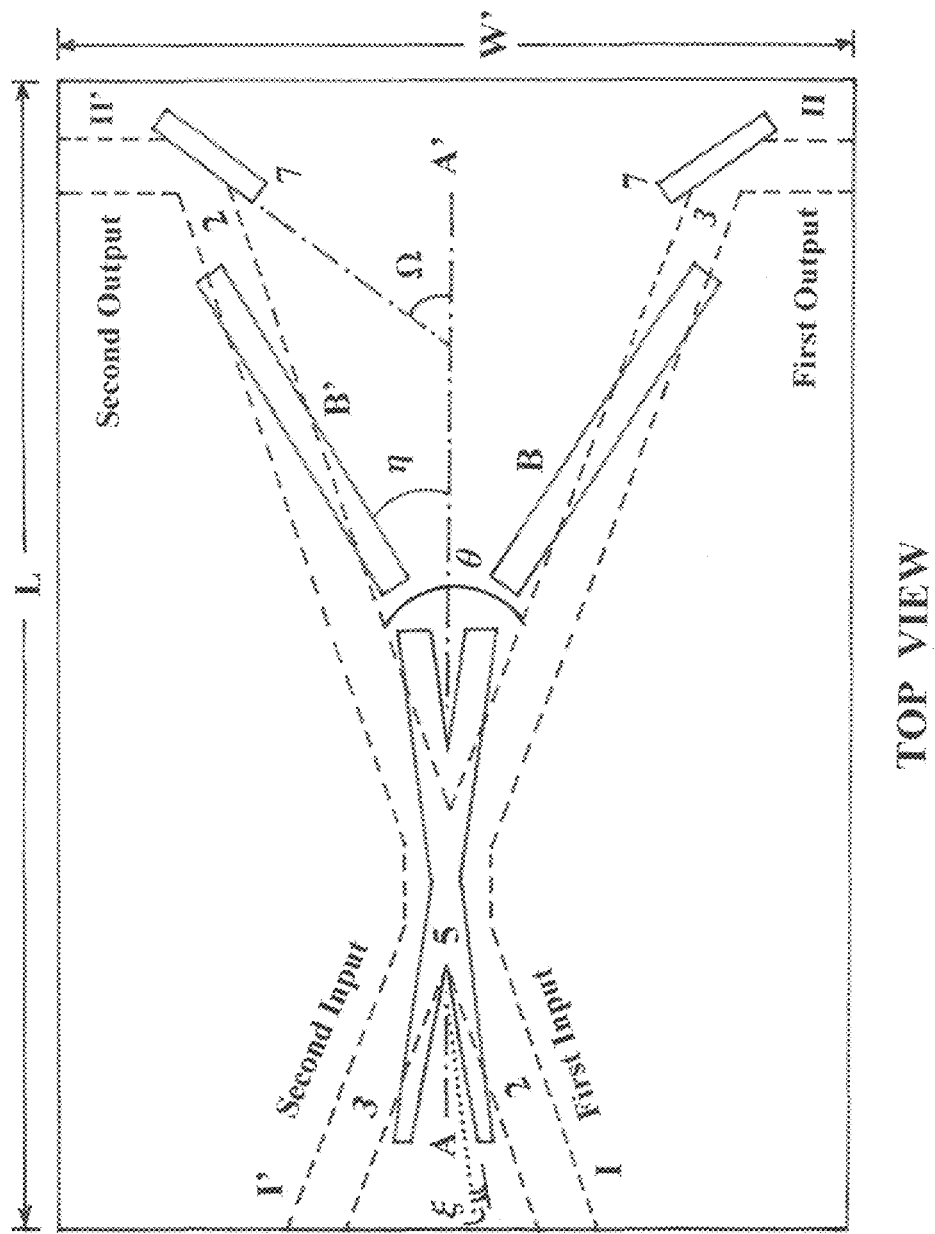
Fig. 3(b) TOP VIEW

DRIVE REQUIREMENTS OF 2X2 SWITCH

PRIOR ART INTERSECTING - WAVEGUIDE SWITCH

ANGULAR SPECTRUM OF GUIDED MODE

OPTIONS OF BLOCKER CONFIGURATION

SINGLE ELECTRODE SWITCH (TOP VIEW)

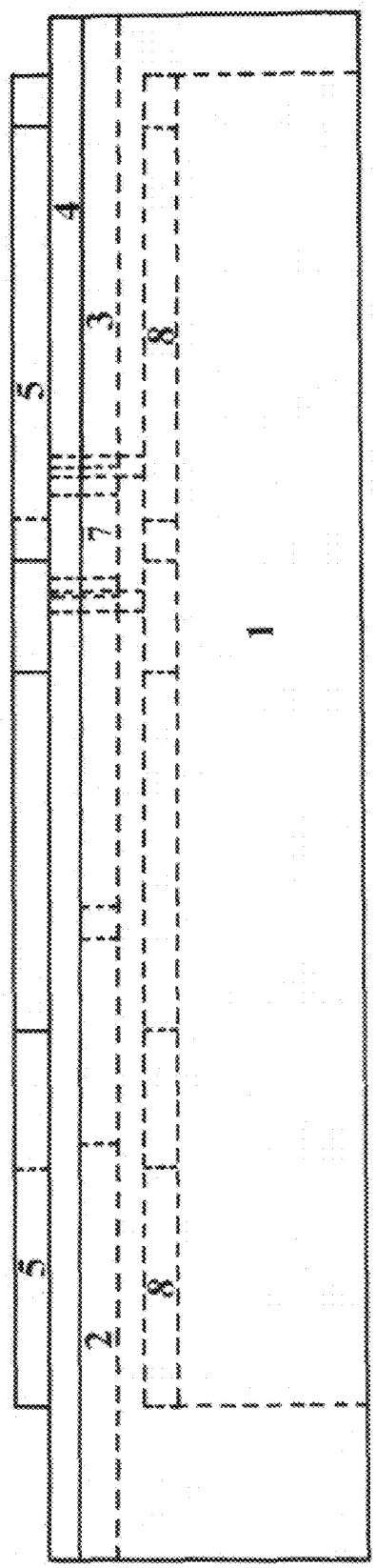

OPTICAL GUIDED MODE SPATIAL SWITCHES AND THEIR FABRICATION

FIELD OF THE INVENTION

This invention relates generally to optical switches, and particularly to fast optical switches for switching of an optical guided mode, wherein Lithium Niobate is used as a substrate into which optical waveguides are formed, and which require a relative refractive index change of only 0.0001~0.0002 to effect spatial switching of an optical guided mode between two output ports.

BACKGROUND OF THE INVENTION

This application contains a numbered list of references that contains helpful material for an understanding of the invention and to further support the following specification. Throughout this specification, where appropriate, reference is made to these references by their assigned number.

Various types of optical guided mode switches are needed in multimedia networks [1-3]. These switches must be capable of handling and processing optical guided modes as in optical communication systems, guided modes are almost exclusively dealt with. Accordingly, guided mode switches must be used where their development is a challenging task and requires a much greater effort compared to that needed in development of unguided light beam switches. As examples, optical ATM (Asynchronous Transfer Mode) switches are introduced in multimedia networks where 1 out of N inputs is wavelength routed to a required output via a switch matrix [4]. Optical cross connects are required to replace electronic SDH (Synchronous Digital Hierarchy) to surpass speed limitations of electronic circuitry and allow for wavelength multiplexing in high capacity networks [5]. In such cross connects, spatial switch matrices are usually used.

Fast switching operation is achievable through electro-optic activity where refractive index is changed by electric field application to an electro-optic material. For instance, Lithium Niobate largely responds to such field application when the z-cut orientation is chosen to use the electro-optic coefficient $r_{33}$ of the crystal. System applications using Lithium Niobate switch matrices have actively been pursued. Y branch structures have been adopted in realization of Lithium Niobate 1×2 switches and experimental verification of switching action over a 300 nm wavelength range has been carried out [6,7].

In semiconductor switches, refractive index change is based on QCSE (Quantum Confined Stark Effect) or current injection to create free carrier plasma effect [8, 9, 10, 11]. Optical amplifiers have been used to compensate for losses in highly absorbent semiconductors [12]. Slowing light in Bragg reflectors where effective refractive index drastically increases has also been used in total internal reflection switches [14].

Polymers were also used in realization of Digital Optical Switches (DOS) where electrooptic and passive polymers have been integrated on the same chip [15]. This same effect has also been used in silica based PLC (Planar Lightwave Circuits) where light phase of Mach Zehnder interferometers is changed to achieve switching operation [16, 17].

In all the above-mentioned examples, overall performance of the switch matrix is dominantly determined by the switch element. That is, the switch element must exhibit properties that include low-loss, high extinction-ratio, low cross-talk, low drive voltage, polarization-independence, small size, reliability and capability of switching at speeds required for specified applications. Depending on requirements in regards to system applications of spatial switches, proper choice of switch material and physical phenomenon upon which the switching mechanism is to be based, are very important, but not easy tasks. For example, when switches are to be used in high speed multimedia networks, mechanical, thermo-optic or even current injection switches are not suitable candidates. Where inherently low loss optical switch elements are preferred, highly absorbent semiconductors may only be considered in association with optical amplifiers. When optical switch size needs to be small on the order of several hundred micrometers, Lithium Niobate which exhibits Pockels electro-optic activity, is not a good material.

Numerous research activities have been carried out to overcome these difficulties. For example, new opto-ceramic materials such as PLZT (Polycrystalline Lanthanum-modified lead Zirconate Titanate) have been developed that are capable of exhibiting refractive index changes much larger than that of Lithium Niobate [18, 19]. However, further investigation will be required to determine their suitability with respect to application in fast switches.

The instant invention provides a switch element using natural or artificial electro-optic materials which can be used as a building block of switch matrices. It can operate because of a relative refractive index change of only 0.0001~0.0002 (see Equation (1) for the definition). To the best of Applicant's knowledge, this is the smallest required refractive index change ever achieved in a fast spatial switch. Therefore, even Lithium Niobate that shows weak but fast electro-optic activity, can be used in realization of such switches. The basis of operation for these switches is a voltage-induced refractive index change in materials that exhibit Pockels or Kerr electro-optic effects, these effects being fast phenomena. Applicant's switches can, therefore, operate at speeds in excess of 100 GHz and are capable of replacing prior art switches based on thermo-optic or plasma type current injection. These prior art switches are incapable of responding to such high speeds. Losses in Applicant's switch element are shown to be acceptably small requiring no optical amplification unless in very largely integrated switch matrices. In Applicant's switch, both extinction ratios of reflection and transmission ports, are very large (>45 dB) due to Applicant's proposed REABEL (Rear Edge Adjusted Broken ELectrode) configuration and because of the introduction of a second blocker electrode. These features cause cross-talk to be better than 50 dB even under severe conditions. In cases that other materials, such as quantum-well semiconductors, opto-ceramics, etc. are used to construct Applicant's switch, refractive index change as a response to an applied voltage is larger than that in Lithium Niobate or Polymers. The size of the switch matrix may, therefore, be greatly reduced and application into optical networks becomes eased. Integration of Applicant's switch elements in matrices of large dimensions is greatly facilitated due to the spatial perpendicularity of the switching ports, which is achieved because of the introduction of an air groove into the switch configuration. Such air grooves reflect an incident guided optical mode, or in another embodiment, reflect the guided mode in both ports, to make these ports generally perpendicular or in opposition. That is, following successful separation of the optical fields corresponding to the two switch states, the guided mode is made to undertake a loss-free total reflection into the transmission port output.

BRIEF DESCRIPTION OF THE DRAWINGS

FIG. 3(b) is a top view of the embodiment of FIG. 3(a) of my new optical switch taken along lines 3p-3p of FIG. 3(a).

FIG. 20(b) is a side view of structural details of single electrode operation of FIG. 20(a) of my new switch.

DETAILED DESCRIPTION OF THE DRAWINGS

1×2 Spatial Switches and Their Fabrication Processes

Optical guided fundamental modes are commonly processed by various optical devices incorporated into an optical communication system. An optical guided fundamental mode is referred to simply as 'guided mode' in the following specification.

In an intersecting waveguide-type optical switch, the guided mode is made to undertake total reflection through Pockels activity in an electro-optic material. The material from which the instant switch is fabricated, by way of example, may be Lithium Niobate. However, the essence of this invention is by no means limited to this material as other optical materials that exhibit an optical activity to other various stimuli may, as well, be used to construct a switch of the instant invention. Such other materials may be polymers, PLZT, semiconductors, etc., which all exhibit a refractive index change responsive to an applied stimulus such as heat, electric voltage or current.

Voltage is applied to the material of the switch i.e. Lithium Niobate, in order to change its refractive index, resulting in total reflection of the incident guided mode at the boundary created by an induced refractive index change. Such optical activity is much faster than the thermo-optic effect or refractive index change due to current injection into semiconductors to create a plasma effect. This same phenomenon has been used in fast optical modulators where an applied voltage changes the guided mode phase of Mach Zehnder arms. Presently, 40 GHz modulators made of Lithium Niobate are commercially available [21] and switching speeds of up to about 100 GHz using this material are possible.

Figure 1A:
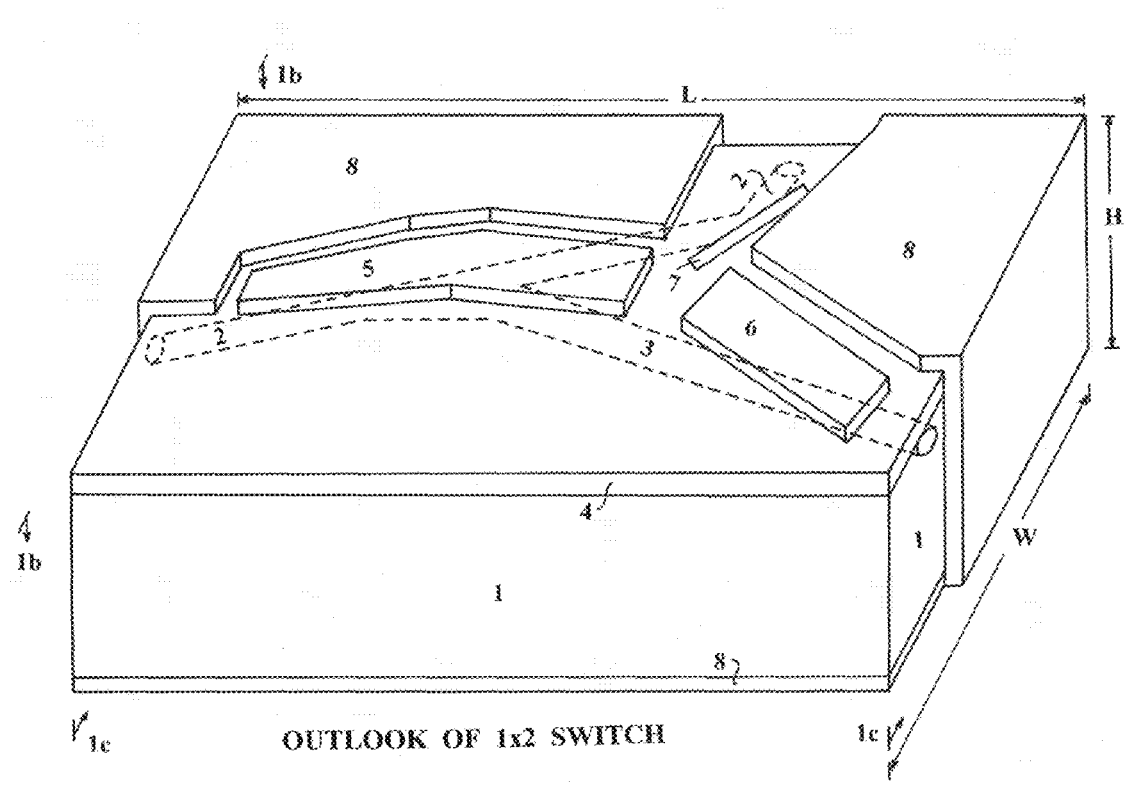
FIG. 1(a) is a perspective view of a 1×2 embodiment showing construction of my new optical switch.
Figure 1B:
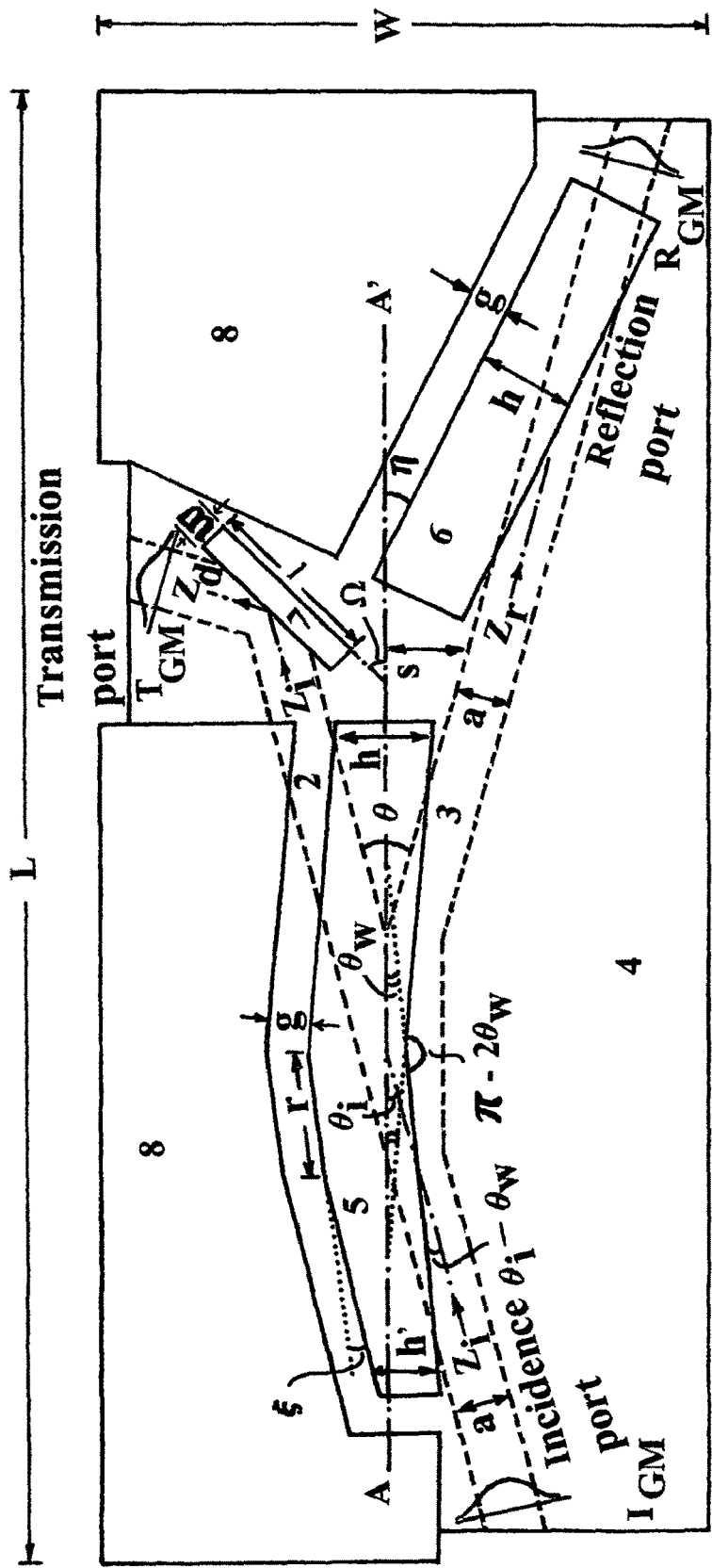
FIG. 1(b) is a top view of the embodiment of FIG. 1(a) of my new optical switch taken along lines 1b-1b of FIG. 1(a).
Figure 1C:
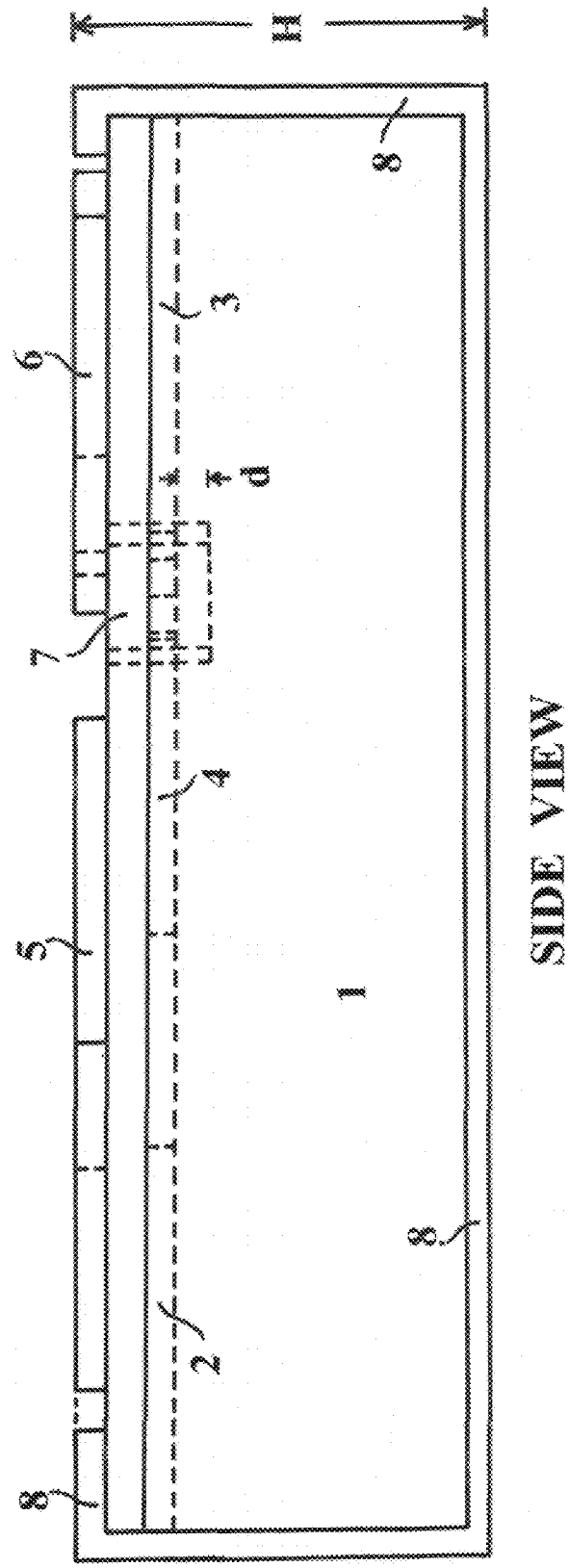
FIG. 1(c) is a side view of the embodiment of FIG. 1(a) of my new optical switch taken along lines 1c-1c of FIG. 1(a).

A top view of the switch of the instant invention is shown in FIG. 1(a), and its side views along 1b-1b and 1c-1c, are depicted in FIGS. 1(b) and (c), respectively. A z-cut Lithium Niobate substrate 1 is chosen into which a cubic air groove 7 of length l and width w is established, as shown in FIGS. 1(a)-1(c). The air groove must be deep enough so that it extends into the substrate 1 at least to a depth equal to the penetration length of the guided mode field (see FIG. 1(c)). On top of the Lithium Niobate substrate, optical single mode waveguides 2 and 3 of width 'a' are established by Titanium diffusion into the substrate. The angle between waveguides 2 and 3 is shown by 'θ' (FIG. 1(b)) which is determined by the magnitude of refractive index change in the Titanium-diffused waveguides $Ti:LiNbO_3$ responsive to applied voltage. After formation of $Ti:LiNbO_3$ waveguides 2 and 3, the whole top area of the substrate crystal (except the air groove) is covered by a $SiO_2$ buffer layer 4. The buffer layer is introduced to protect the optical field from direct contact with an electrode. The buffer layer's thickness may be varied to adjust both the magnitude of voltage applied to electrodes 5 and 6 to achieve the required refractive index change, and match the phase velocities of applied voltage signal traveling along electrode 5 and 6 and guided mode propagating in optical waveguides 2 and 3 (see Section XI). Although these requirements will further be discussed later but buffer layer thickness of about 2~3 micrometers would achieve these adjustments. Finally, electrode 5 of REABEL (Rear Edge Adjusted Broken ELectrode) configuration and blocker electrode 6 (the second electrode) are formed on buffer layer 4 using gold or silver. Electrodes 5 and 6 are electrodes to which a voltage is applied in order to effect a refractive index change within an optical waveguide. There are many options in positioning ground electrode 8 and as one example, it is taken to cover portions of the top, right, left, rear and the whole bottom surfaces as shown in FIGS. 1 (a), (b) and (c) although it may just cover an area beneath electrodes 5 and 6. A gap between electrodes 5 and 6 and ground electrode 8 is shown by 'g' as shown in FIG. 1(b).

The fabrication processes of the switch are the same as those followed by technicians involved in Lithium Niobate technology. These processes are articulated as follows. First the air groove 7 is drilled, cut or etched by conventional methods known to those in the art, in a high quality z-cut Lithium Niobate substrate 1. During fabrication of air groove 7, care must be taken to avoid wavelength size corrugations and if necessary, the groove may be ground using abrasive granules in order to smoothen any roughness that otherwise may occur. The substrate is washed, cleaned and dried by processes known to those skilled in the art. Then, optical waveguides 2 and 3 are accurately patterned (see FIG. 1(*b*)) and Ti strips are laid on the patterned area and temperature is raised to let Ti diffuse into Lithium Niobate substrate 1. The amount of Ti diffusion into $LiNbO_3$ substrate is controlled by the temperature and the time interval during which the sample is kept at the raised temperature. This process of waveguide formation may vary among different manufacturers, although temperature is typically raised to about several hundred degrees centigrade for duration of ten plus hours. Then, the top area (except the air groove) is covered by the $SiO_2$ buffer layer 4. Finally, hot and ground gold or silver electrodes 5, 6 and 8 are patterned and delineated.

As to the $LiNbO_3$ crystal orientation, a z-cut substrate is chosen in the instant switch to use its $r_{33}$ electro-optic coefficient which is the largest among all other coefficients of this crystal. This choice would result in the smallest voltage applied to electrodes 5, and 6 required in electric field creation inside optical waveguides 2 and 3. Substrates with other crystal orientations may also be used as the material of the instant invention but because of smaller electro-optic coefficients, the voltages required in electric field creation would be larger than that in case of a z-cut substrate.

III—Switch Operation

When a voltage is applied to an electrode say REABEL 5 in FIG. 1(*b*), electric field is generated inside waveguides 2 and 3 under this electrode, which changes the refractive index of these waveguides through Pockels activity. This is what is meant by 'activation' of an electrode used throughout this Application.

Significantly, electrodes 5 and 6 overlie waveguides 2 and 3 so that the electric field developed by their activation, extends through the waveguides creating a refractive index change, and thus a refractive index boundary, in the Ti:$LiNbO_3$. That is, the refractive index boundary in these waveguides between the Ti:$LiNbO_3$ having a changed refractive index because of electric field of activated overlying electrode, and the unchanged portion of the waveguide with no electric field, acts to reflect the incident guided mode. The incident guided mode may come from an optical fiber connected to the input port, from a preceding optical device, or from a laser source. Thus, the angles of the two of front edges of REABEL 5 overlying waveguides 2 and 3 at their crotch point is such that when activated, the boundaries formed by these edges reflect the incident guided mode in waveguide 2, into waveguide 3 and out of the switch via the reflection port. As REABEL 5 is of finite width, three layers each having a different refractive index, are formed which correspond to the front and rear edges of the activated REABEL 5 as though the guided mode is reflecting from a three layer structure. With REABEL 5 not activated, the incident guided mode in waveguide 2 propagates directly along $Z_i$ to air groove 7, where the boundary between Ti:$LiNbO_3$ and air serves to reflect the guided mode out of the switch via the transmission port. In this instance, blocker electrode 6 (simply called as 'blocker' hereinafter) is activated to develop a boundary used to reflect any portion of the guided mode power coupled to waveguide 3 into its cladding layer and away from the reflection port.

Referring to FIGS. 1(*a*) and 1(*b*), when the incident guided mode $I_{GM}$ is launched into optical waveguide 2 and with REABEL 5 activated by an applied voltage of about 10 volts (as will be further explained), $I_{GM}$ undertakes total reflection towards the reflection port and emerges out of waveguide 3 as $R_{GM}$ along $Z_r$. When REABEL 5 is left inactivated, the incident guided mode $I_{GM}$ propagates along $Z_i$ to the air groove where it undertakes a total reflection and emerges out of the transmission port along $Z_d$ as $T_{GM}$. The placement and inclination angle $\Omega$ of air groove 7 with respect to A-A' axis are such that the incoming guided mode propagating along waveguide 2, is totally reflected at Ti:$LiNbO_3$—air boundary and exits the waveguide of transmission port. Under such circumstances, a portion of the guided mode power is coupled to waveguide 3 (along $Z_r$) but blocker 6 is activated to block this undesired coupled power. This blockage is very effective in improving the extinction ratio of the reflection port and will further be quantitatively explained later.

Significantly, the rear edge adjustment of the REABEL configuration plays a key role in this invention and its inclination at the angle $\xi$ (see FIG. 1(*b*)) is very effective in improving the reflection process of the guided mode. That is, in reflection of the guided mode from the above mentioned three layer structure, a portion is totally reflected at the front boundary with the remaining portion transmitted to the middle layer. A part of the transmitted portion undertakes total reflection back into the middle layer at the rear boundary. A very small portion of the guided mode will ultimately be transmitted into the third layer at the rear boundary appearing in waveguide 2 which degrades both the overall reflectivity of REABEL 5 and extinction ratio of transmission port (to be further explained later). Inclination of the rear edge of REABEL 5 is a novel approach in suppression of the power transmitted to the third layer by improving reflectivity of the rear boundary and, consequently, the overall reflectivity of the three layer structure.

Figure 2:
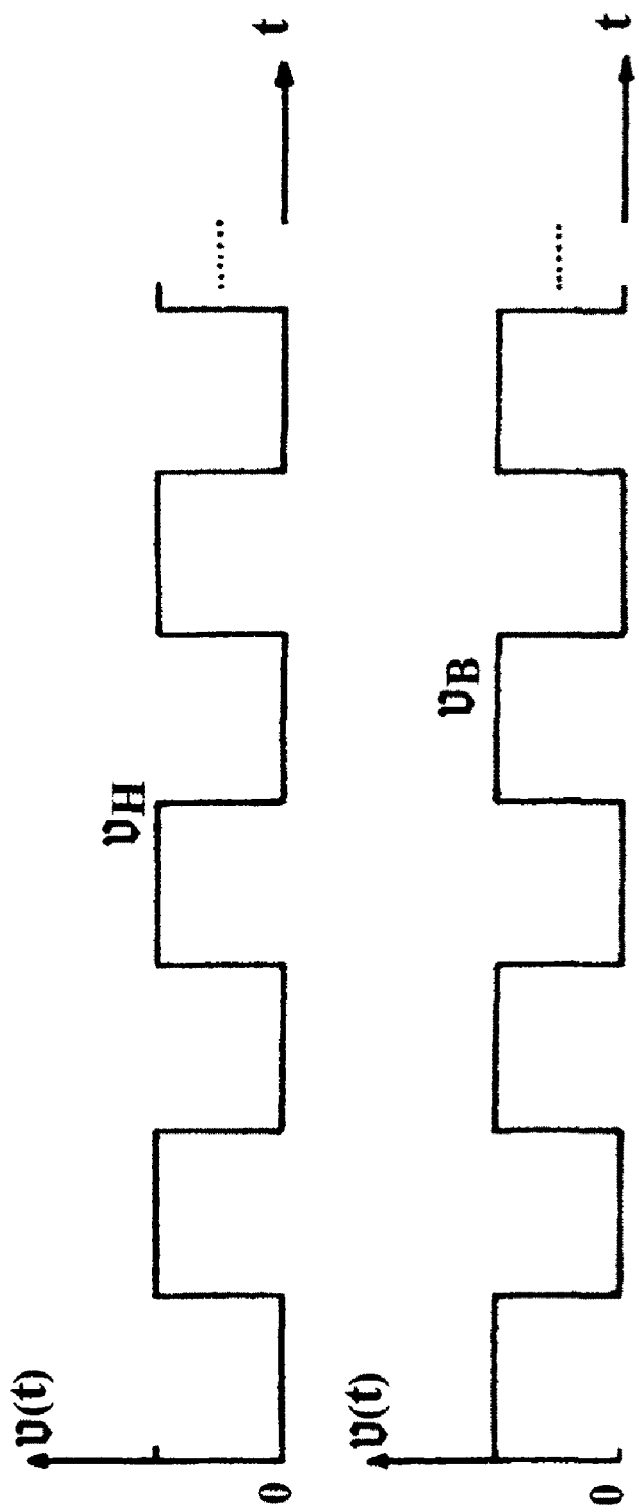
FIG. 2 illustrates electrical drive waveforms of switching operation of my new switch of FIG. 1(a)

Under drive signal being applied to REABEL 5, the blocker 6 must remain inactivated. Therefore, REABEL 5 and blocker 6 must be activated alternately to switch the incident guided mode $I_{GM}$ between the two states of $R_{GM}$ and $T_{GM}$. The drive signals applied to REABEL 5 (shown as $v_H$ and blocker 6 (shown as $v_B$ must, therefore be as shown in FIG. 2 where the information pulses are taken to be, for example, square in shape, although other waveforms may also be used.

The 1×2 switch already described will be shown in Section VI to exhibit excellent characteristics. Yet it is seldom used in optical communication systems as Y branches can replace them. However, 2×2 switches are very much needed, and may be expeditiously developed using characteristics and properties of Applicant's 1×2 switch.

IV—2×2 Spatial Switches

Figure 3A:
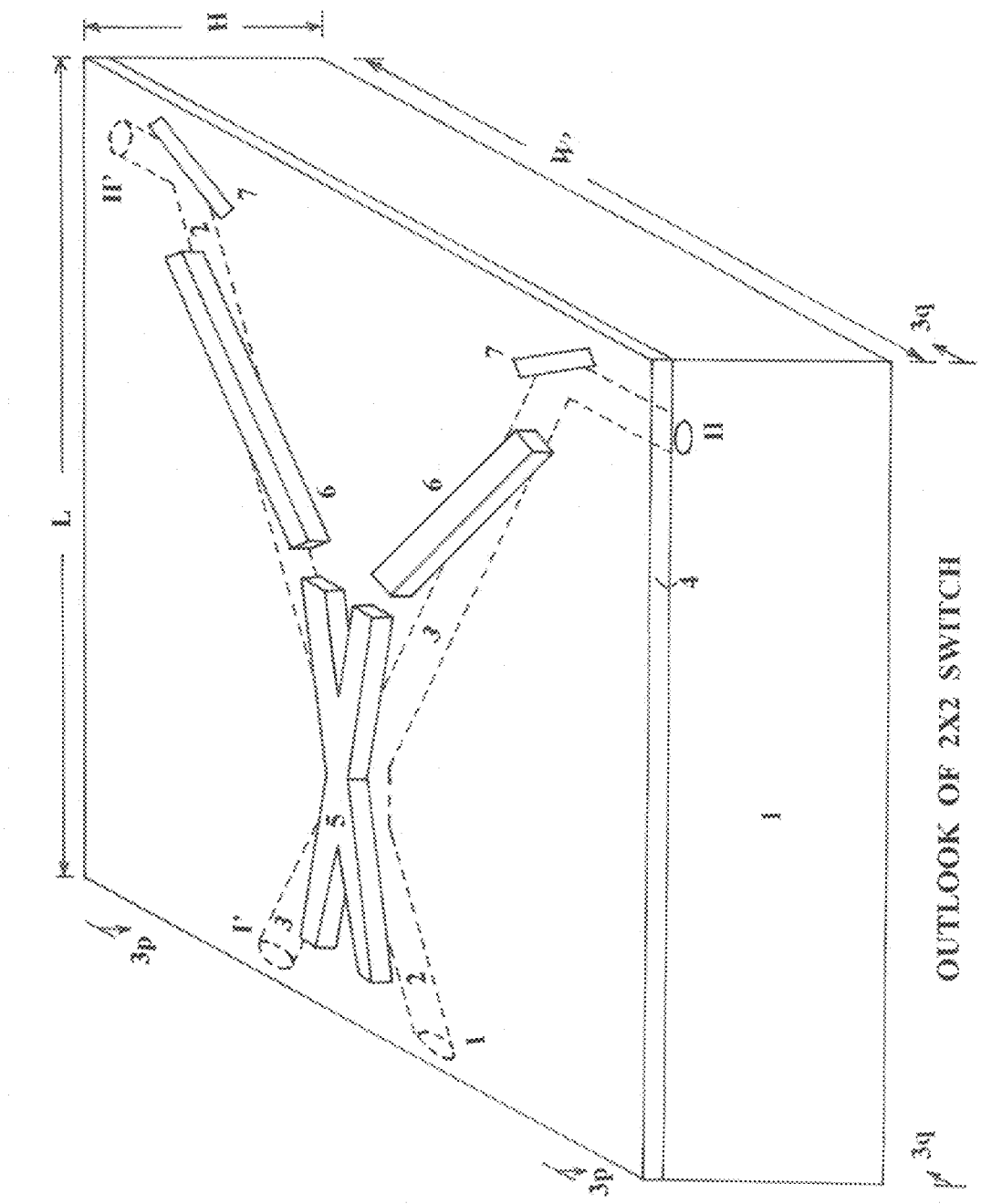
FIG. 3(a) is a perspective view of a 2×2 embodiment showing construction of my new optical switch.
Figure 3C:
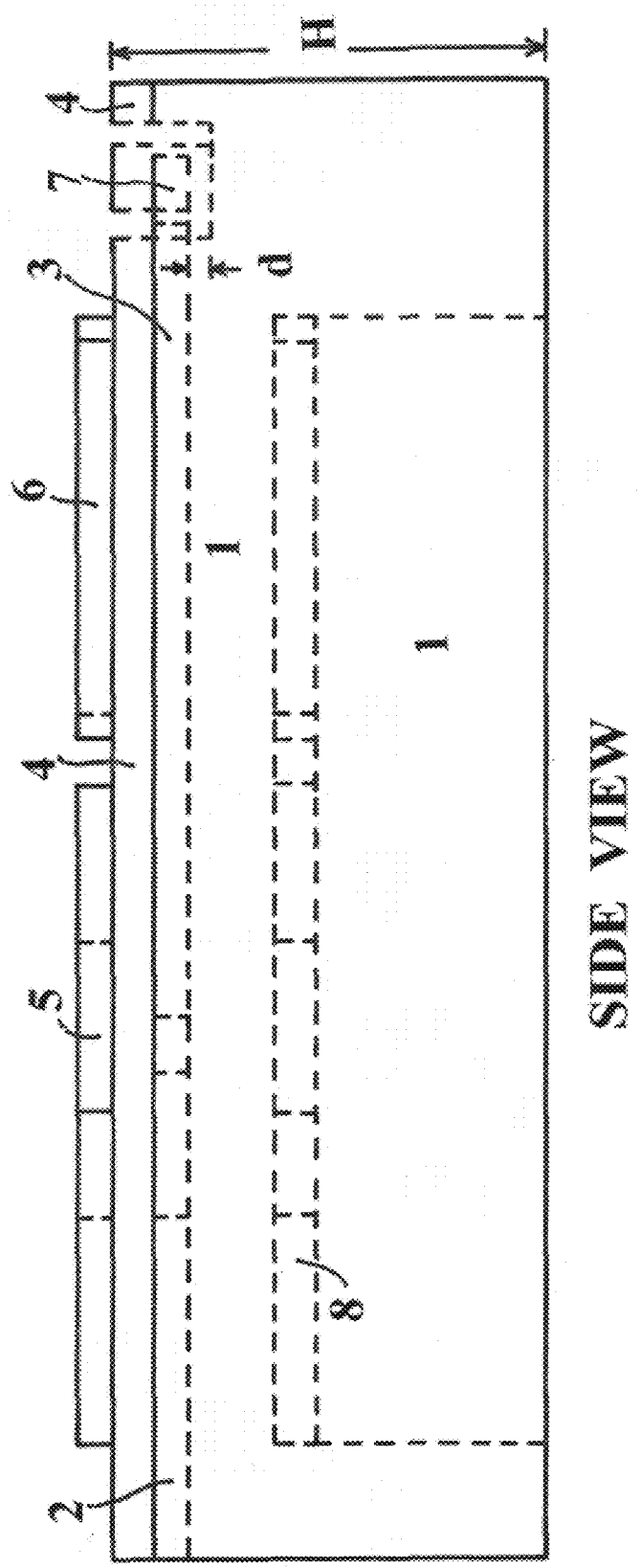
FIG. 3(c) is a side view of the embodiment of FIG. 3(a) of my new optical switch taken along lines 3q-3q of FIG. 3(a).

2×2 switches are formed by combining two 1×2 switches as shown in FIG. 3(*a*) where symmetry about a plane perpendicular to the substrate and passing through A-A' axis of the 1×2 switch (shown in FIG. 1(*b*)) is employed. Top and side views along 3*p*-3*p* and 3*q*-3*q*, are shown in FIGS. 3(*b*) and 3(*c*), respectively. The two blockers are designated as B and B' while the two input ports are shown by I and I' and the output ports by II and II', all depicted in FIG. 3(*b*). If the incoming guided mode is incident onto port I of the 2×2 switch and with REABEL 5 activated, the output will appear at port II requiring for no activation onto B. Under this situation, since there is no guided mode in the waveguide under blocker B', this blocker plays no role and its activation is insignificant. If B is activated but REABEL 5 and B' are not, the output will emerge from port II'. If the incoming guided mode is incident onto port I', and with REABEL 5 activated but with no activation onto B', the output will appear at port II'. Under this situation, since there is no guided mode in the waveguide under blocker B, its activation is insignificant.

With B' activated and no activation onto REABEL 5, the output will come out of port II with the requirement that B be left inactivated. Denoting the state of voltages applied to the REABEL 5 as $V_{REABEL}=v_H$ or $V_{REABEL}=0$, the vector $$V^T_{REABEL}=[v_H,0] \quad (1)$$

shows the state of the REABEL in regards to whether voltage is applied ($V_{REABEL}=v_H$) or is not applied ($V_{REABEL}=0$). The superscript T is used to denote that the vector is transposed to a horizontal representation. When the incoming guided mode enters into port I (with no input to port I'), the activation to blockers $B_I$ and $B'_I$ must be in the form of $$B_I^T=[0,v_{BI}] \quad (2)$$

and $$B'^T_I=[v_{B'I},0]. \quad (3)$$

Figure 4:
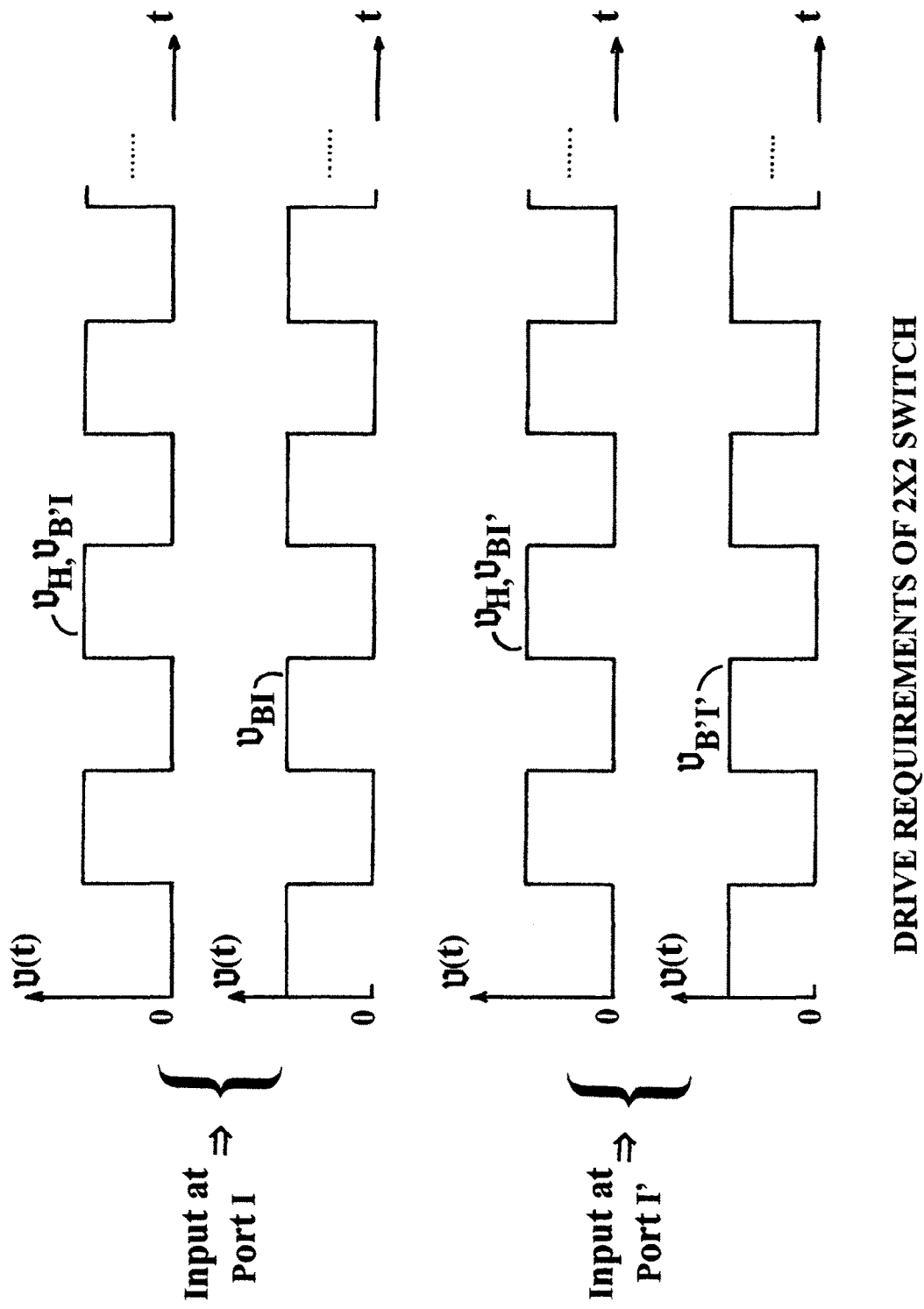
FIG. 4 illustrates electrical drive waveforms of switching operation of my new switch of FIG. 3(a).

This shows that $B_I^T$ is orthogonal to $V^T_{REABEL}$, but $B'^T_I$ is parallel to it. When the guided mode is incident into port I' (with no input to port I), the activations must be in the form of $$B_I^T=[v_{BI},0] \quad (4)$$

and $$B'^T_I=[0,v_{B'I}], \quad (5)$$

showing that $B_I{}^T$ is parallel to, but $B'^T_I$ is orthogonal to $V^T_{REABEL}$. Therefore, when the incoming guided mode enters into port I, $B_I^T$ is orthogonal to the parallel vectors $V^T_{REABEL}$ and $B'^T_I$. When the incoming light enters into port I', $B'^T_I$ is orthogonal to the parallel vectors $V^T_{REABEL}$ and $B_I^T$. That is, pulses (assumed to be rectangular, for example) used to gate ports II and II' need to be as shown in FIG. 4 where voltages are all taken to be equal in amplitude ($v_H=v_{BI}=v_{BI'}=v_{B'I}=v_{B'I'}$). As seen in FIG. 4, in case that the guided mode is incident at Port I, the product of $V^T_{REABEL}$ and $B_I^T$ remains always zero. Further, the product of $B_I^T$ and $B'^T_I$ is also always zero. Similarly, in case that the guided mode is incident at Port I', the product of $V^T_{REABEL}$ and $B'^T_I$ and also the product of $B_I^T$ and $B'^T_I$ remain always zero. Therefore, orthogonality requirements are all satisfied.

When guided modes are incident at both ports I and I' simultaneously and REABEL 5 is not activated, the output emerges at port II when B' is activated (and B is not). Reversing the blocker activations (that is when B is activated but B' is not) will result in the output to emerge from port II'. Under these circumstances, the optical power incident on either of the respective activated blocker will scatter away. If guided modes are incident on both ports I and I' and REABEL 5 is activated, the output emerges at port II when B' is activated (but B is not). When B is activated (but B' is not), the output emerges at port II'. That is, the situation is repeated. If all electrodes REABEL 5 and blockers B and B' are activated simultaneously, the input guided mode power would all scatter away. Soft-ware can be developed and used to accurately control electrode activations in correspondence to the incoming guided mode, and facilitate management of large scale networks with matrices composed of such switch elements.

It would be possible to eliminate one of the two air grooves and its respective inclined waveguide and adjust an inclination of a remaining air groove and its respective inclined waveguide to have two mutually perpendicular output ports, as in a 1×2 switch (described earlier).

V—Device Dimensions

As θ, $\theta_w$, $\theta_i$, η, ξ (shown in FIG. 1(*b*)) are all very small angles, the switch becomes a long device. That is, the switch may be a few millimeters long (L~a few mm). The device width is mainly determined by θ and widths of the waveguides 2, 3, that of electrode 5, air groove length λ and Ω. Taking these device specifications into account, width of the device may be on the order of W~100 micrometers. The device height is mainly determined by the substrate thickness and may be about H~550 micrometers. The air groove 7 must be long enough to traverse the waveguide width at a specific angle (see section VIII) to reflect the guided mode. Its length may be on the order of λ~100 micrometers. ω must be much larger than the wavelength and ω~40 micrometers, is considered to be sufficiently wide. d needs to be larger than the length of optical field penetration into the substrate and d~15 micrometers is sufficiently deep. These dimensions are the smallest requirements but the actual size of air groove may be chosen a few times larger to ease its fabrication. Length L and height H of a 2×2 switch would be the same as those of a 1×2 switch but its width W' becomes about two times larger than W.

VI—Switching Characteristics and Design Data

In order to be able to properly design the 1×2 and 2×2 switches shown in FIGS. 1 and 3, their switching characteristics must accurately be investigated. The switching behavior of the 2×2 switch is based on that of the basic 1×2 switch element shown in FIGS. 1(*a*), (*b*) and (*c*) which is determined in the following sections.

VI-A: REABEL Electrode Configuration

Materials exhibiting refractive index change as a result of application of a stimulus, such as Pockels or Kerr optical activity responsive to application of voltage, or materials that exhibit refractive index change responsive to application of heat, current injection, etc. may be used to implement the instant invention. Among such materials, the design of a switch using Lithium Niobate is the most difficult because of the small magnitude of refractive index change caused by voltage application resulting in a very small angle θ as described earlier. In case of other materials such as semiconductors, PLZT, etc., refractive index change responsive to application of respective stimulus would be larger than that in case of Lithium Niobate and their design becomes easier. The most difficult process of achieving practically acceptable switching characteristics of z-cut Lithium Niobate switches is presented hereunder.

The relative refractive index change achieved through voltage application to this material, i.e. Lithium Niobate, is shown by $\Delta_v$ and given by:

$$\Delta_v=(n_0^2-n_v^2)/2n_0^2 \quad (6)$$

where $n_0$ denotes the refractive index of the material at zero voltage and $n_v$ the refractive index at applied voltage v. In light total reflection at a boundary with relative refractive index difference $\Delta_v$, the critical complementary angle $\theta_{cc}$ becomes $$\theta_{cc}=\rho/2-\text{Sin}^{-1}(1-2\Delta_v)^{1/2}. \quad (7)$$

Figure 5:
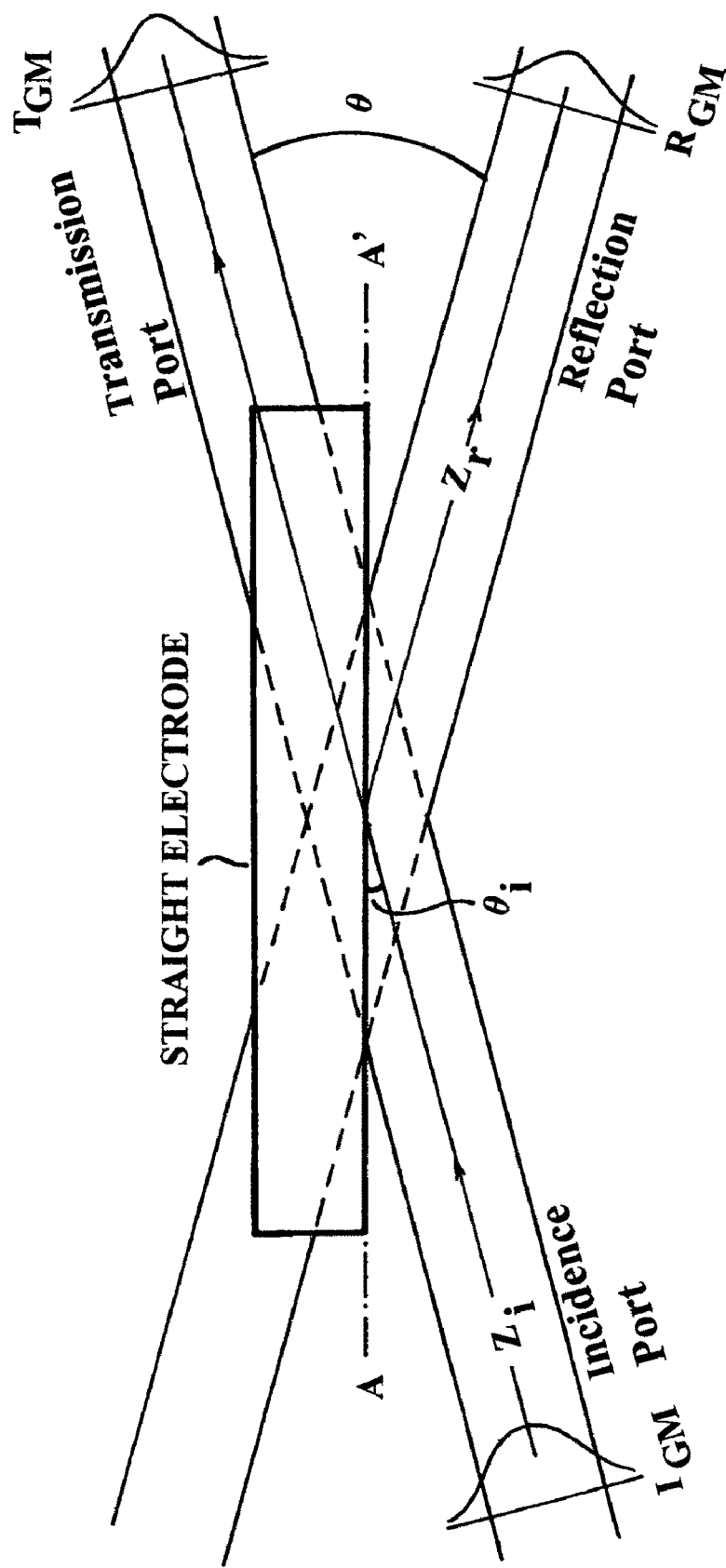
FIG. 5 is a view of an intersecting-waveguide optical switch of the prior art.

In the instant switch, the very low refractive index change of $\Delta_v=0.0001$ is targeted which gives $\theta_{cc}\sim 0.8°$ and therefore, the extent of angle of intersection needed in total reflection is very limited. Yet, this is only a very rough estimation of the angle and in fact, is a drastic overestimation when guided modes are treated. It was previously shown that in total reflection of the guided modes, the angle is further reduced by a factor of ~½ [22]. This results in the small angle of $\theta_{cc}\sim 0.4°$ that makes the device very difficult to be fabricated. That is why intersecting waveguide configuration using Lithium Niobate material has been considered inappropriate in realization of fast switches. Scientists turned to use other materials (such as semiconductors where absorption losses are very high), or applied different physical phenomena such as thermo-optic effect which is slower than Pockels by about 3 orders of magnitude. The Applicant attempted to overcome these difficulties and proposed the Bow-Tie electrode configuration to replace the conventionally used straight ones [23]. This proposed configuration possesses the capabilities of widening the deflection angle of guided modes and lowering the reflection loss. The Bow-Tie electrode was adopted in a carrier injection type switch and its advantages were confirmed [24]. The prior art conventional straight electrode is shown in FIG. 5 which has remained inappropriate to Lithium Niobate material because of poor light extinction and small intersection angle $\theta$. In this regard, the lower part of the Bow-Tie electrode (called a broken electrode) with two portions is adopted in FIG. 1(b). For comparison, the lower edge of a straight electrode is taken along the A-A' axis with reference to which the angle of incidence $\theta_i$ and the widening angle $\theta_w$ are defined. Further, as stated in section III, the rear edge of the broken electrode (adjacent to the ground electrode 8), is intuitively inclined at the angle $\xi$ which will be shown to be very effective in increasing the guided mode reflectivity and improving reflection loss and extinction ratio (to be discussed later).

The novelty of the broken electrode is described with reference to FIG. 1(b). The two left and right portions of the broken electrode are inclined at $\theta_w$ with respect to the A-A' axis. That is, in the case of a broken electrode, the lower edges overlying waveguides 2 and 3 intersect at the angle $\pi - 2\theta_w$ instead of $\pi$ as would be the case for a straight electrode. The guided mode propagating along $Z_i$ is incident at the angle $\theta_i$ and is reflected along $Z_r$ when the REABEL 5 is activated. The key point is that although the intersection angle $\theta$ remains to be $\theta = 2\theta_i$ (similar to the situation in a straight electrode), the angle of incidence is $\theta_i - \theta_w$ (and not $\theta_i$) resulting in improved reflection properties (such as smaller reflection loss and better light extinction compared to those in case of a straight electrode) of the guided mode. In the case of a broken electrode, light is totally reflected if $\theta_i - \theta_w$ is less than or equal to the critical complementary angle $$\theta_i - \theta_w = \theta_{cc}. \quad (8)$$

Therefore, the incident light is deflected by $2\theta_w$ and is again, totally reflected if the angle of incidence on the right portion of the broken electrode is $$3\theta_w - \theta_i = \theta_{cc}. \quad (9)$$

That is, the widening capability of the broken electrode becomes $$\theta_w = \theta_i/2 \quad (10)$$

corresponding to two successive total reflections by the left and right portions, respectively, with intersection angle $\theta$ widened to $$\theta = 4\theta_w. \quad (11)$$

VI-B: Reflection State

Figure 6:
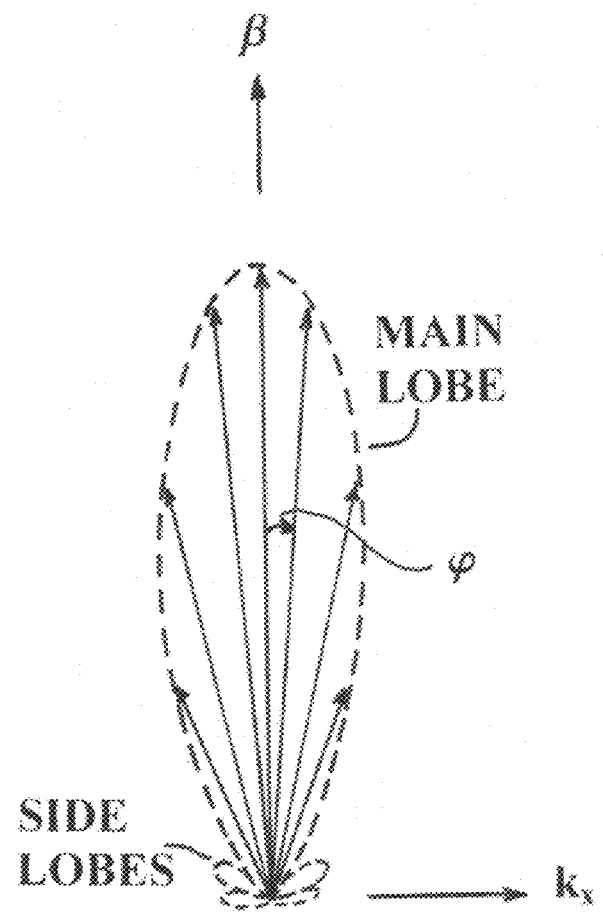
FIG. 6 is an illustration of the angular spectrum of an optical guided mode routed in my new switch.

In the case of a guided mode, the above novel idea of the REABEL electrode used to reflect the incident light is treated by expansion of the guided mode into a continuum of plane-waves. FIG. 6 shows a typical spectrum in the inverse plane of propagation constant $\beta$ and transverse wave number $k_x$ where $\phi$ denotes the angle with respect to the direction of propagation of the guided mode $Z_i$ (shown in FIG. 1(b)) and is taken positive (negative) in the counterclockwise (clockwise) direction. The processes and mathematical descriptions of determination of switching characteristics are described later herein. As seen, most plane waves fall within the main lobe followed by some small side lobes. The plane wave spectrum of the guided mode is determined by the waveguide structural specifications as well as the light wavelength. The angular width of the main lobe widens when the confinement extent of the guided mode is improved [22]. In this regard, V, a, $\Delta_w$ and $\lambda$ denote the normalized wavelength, the optical waveguide width, the relative refractive index difference of the waveguide core (Ti:LiNbO$_3$) and the cladding (LiNbO$_3$) and light wavelength, respectively. Once the guided fundamental mode (with a plane wave spectrum shown in FIG. 6) is launched into waveguide 2 as $I_{GM}$ (shown in FIG. 1(b)), the interplay of these parameters and their influence on reflection loss is investigated.

Figure 7:
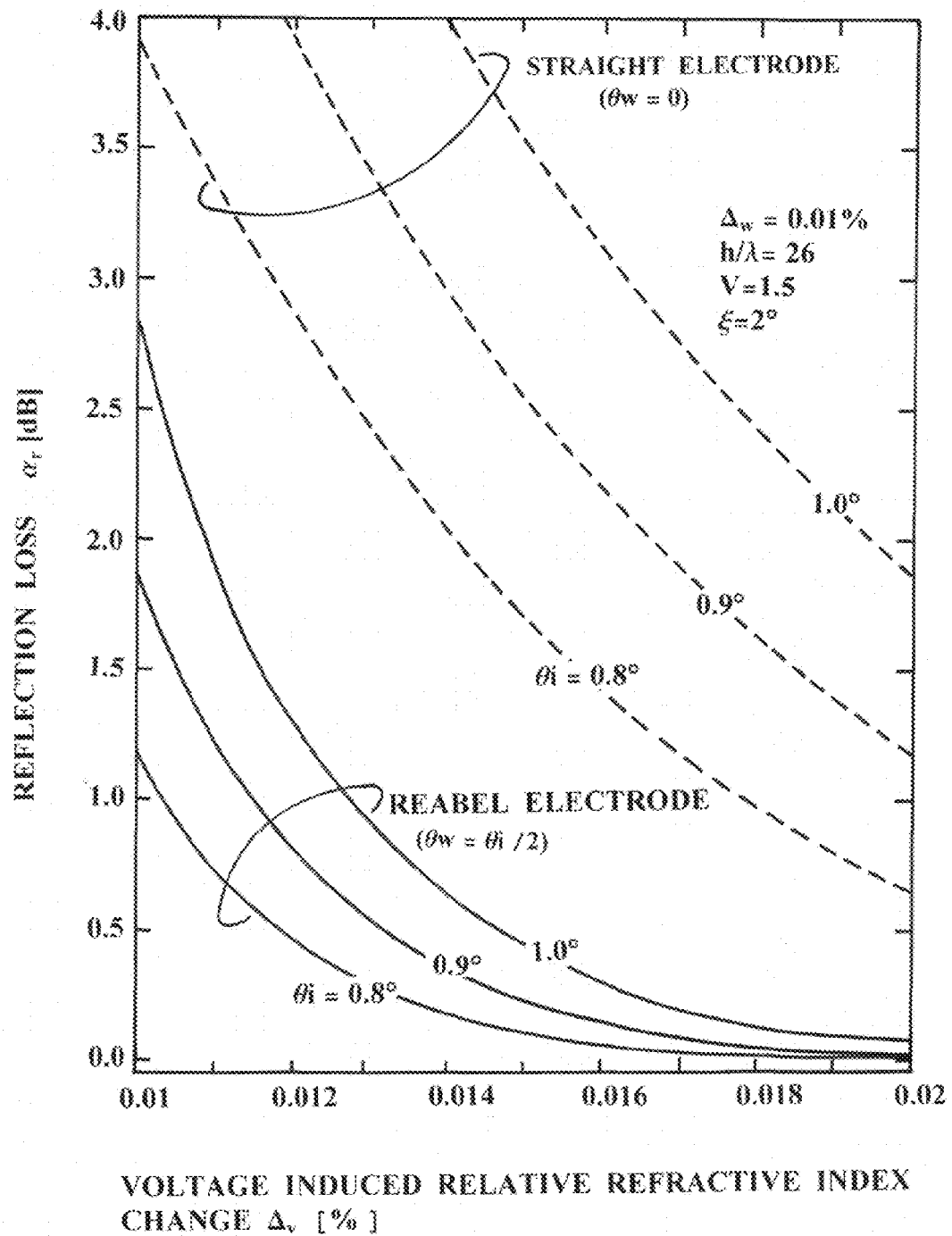
FIG. 7 is an illustration of reflection loss versus percentage of relative refractive index change of my new switch as compared to that of prior art switch of FIG. 5.

There are some plane wave components of the guided mode propagating at extreme angles with respect to the direction of propagation of the guided mode $Z_i$ which fail to totally reflect. This results in reflection loss of the guided mode. Such reflection losses, denoted by $\alpha_r$, are compared for the two cases of straight and REABEL electrodes with the results depicted in FIG. 7, where variations of $\alpha_r$ are shown against those of the voltage induced relative refractive index difference $\Delta_v$ and the angle of incidence $\theta_i$ taken as the parameter. As seen, when the REABEL configuration is introduced into the switch, reflection loss $\alpha_r$ is reduced quite remarkably. For example, in case of a straight electrode (i.e., the prior art configuration shown in FIG. 5) and at $\theta_i = 1.0°$, reflection loss is about $\alpha_r = 3.5$ dB when the voltage induced relative refractive index change is $\Delta_v = 0.00015$. Remembering that other types of loss (such as scattering, absorption and reflections from the following device) are also present that must be added to $\alpha_r$. Therefore, switches with straight electrodes are rendered useless because of such high optical losses. Under the same circumstances (i.e., $\theta_i = 1.0°$ and $\Delta_v = 0.00015$), reflection losses of a switch with the REABEL is substantially reduced to $\alpha_r \sim 0.4$ dB. This achievement is quite remarkable and introduction of the REABEL configuration brings about the possibility of realization of fast switches made of Lithium Niobate.

Figure 8:
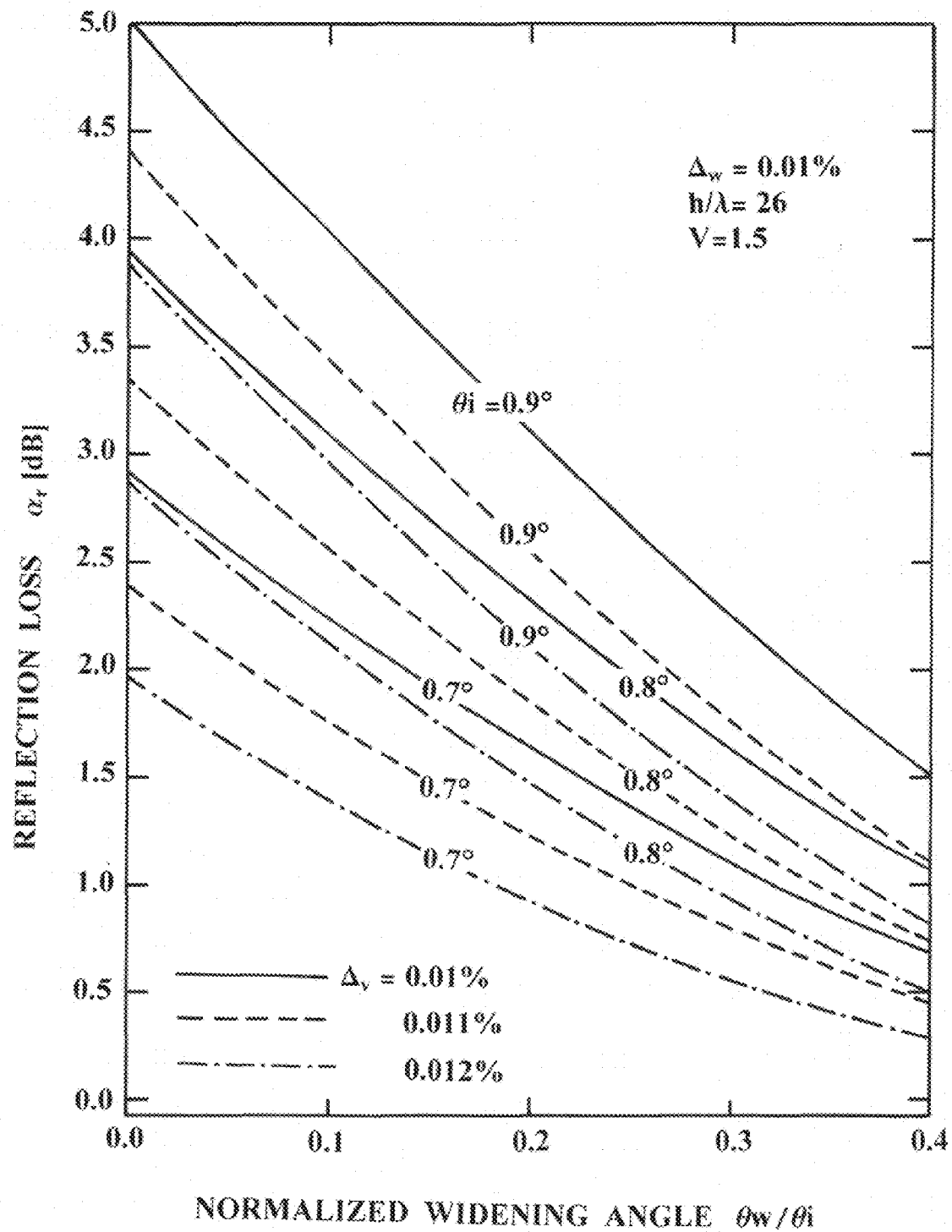
FIG. 8 is a graph illustrating relationships between reflection losses and relative widening angles.

When the widening angle $\theta_w$ is changed from zero (i.e. a straight electrode) to $\theta_w/\theta_i = 0.4$, the evolution effects upon loss reduction is shown in FIG. 8 where the voltage induced relative refractive index change is taken to be in the range $\Delta_v = 0.0001 \sim 0.00012$. As seen, the loss-reduction capability of the broken electrode improves quite remarkably when $\theta_w$ is increased. Angles in opto-electronic devices such as Mach-Zehnder structures, Y-branches, etc., are about $1 \sim 2°$. Remembering that $\theta = 2\theta_i$, the reflection loss of a broken electrode is only $\alpha_r = 0.5$ dB at $\theta = 1.6°$ and $\Delta_v = 0.00012$, when its widening angle is designed to be $\theta_w/\theta_i = 0.4$. Therefore, it becomes possible to conclude that as the consequence of adoption of the REABEL configuration, Lithium Niobate switches become feasible.

Figure 9:
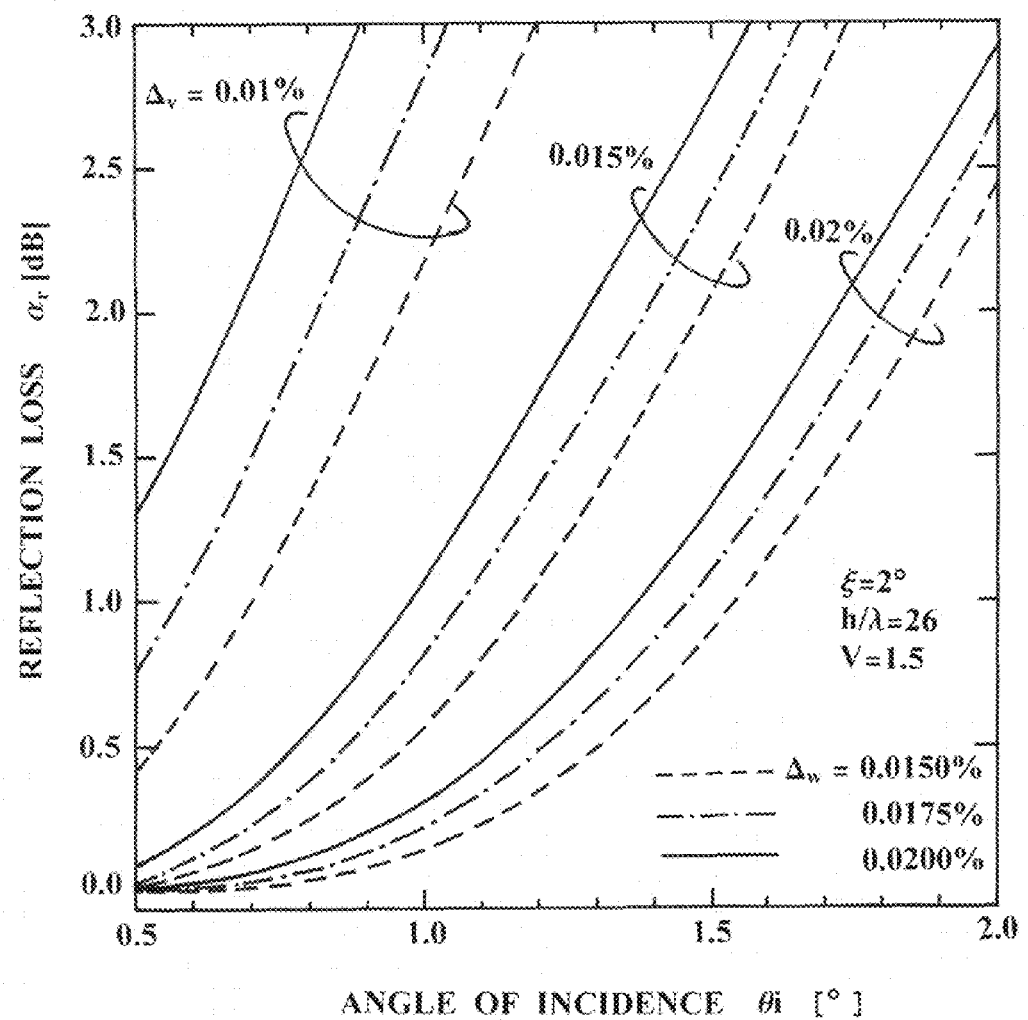
FIG. 9 is a graph illustrating relationships between reflection losses and angles of incidence.

The relative refractive index difference $\Delta_w$ of the optical waveguide plays a significant role on reflection loss $\alpha_r$. As shown in FIG. 9, the reflection loss $\alpha_r$ increases with increasing $\theta_i$ which is caused by plane wave components failing to undertake total reflections. The reflection loss also increases with increasing the relative refractive index difference $\Delta_w$ of the optical waveguide. This is expected and can be explained as follows. With reference to the plane wave spectrum shown in FIG. 6, as the waveguide relative refractive index difference $\Delta_w$ is increased, the angular width of the main lobe is also increased. This will result in increased reflection loss $\alpha_r$ caused by a larger portion of the plane wave components which fail to undertake total reflections.

Figure 10:
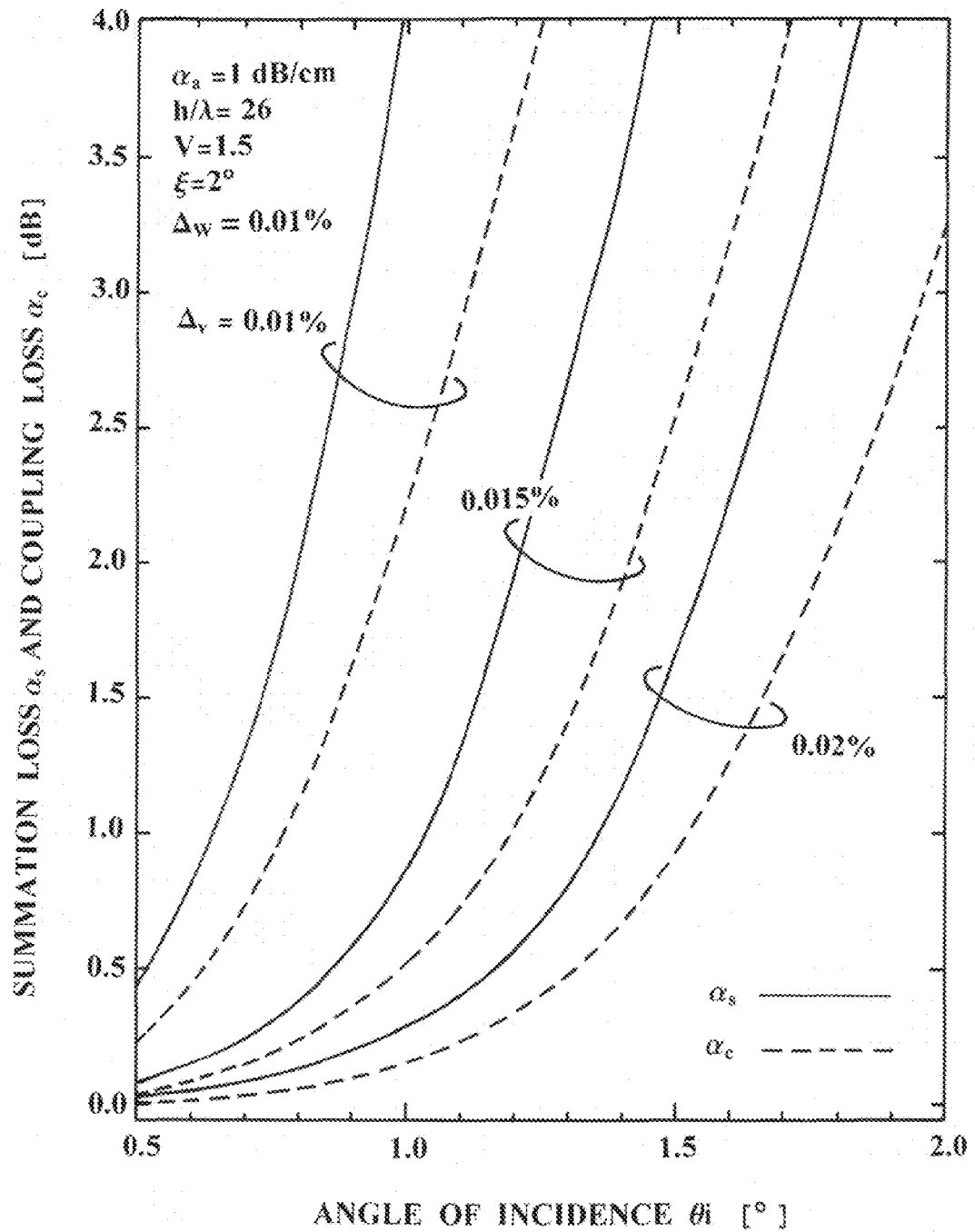
FIG. 10 is a graph illustrating relationships between angles of incidence and summation and coupling losses.

There are various types of losses associated with reflection of the guided mode under activated REABEL. The reflected guided mode suffers from distortions caused by plane wave components failing to undertake total reflections and phase delays of the totally reflected ones. Therefore, scattering losses are generated when such a reflected guided mode is to couple to the eigen mode of the reflection port waveguide. This type of loss is referred to as coupling loss, and is shown by $\alpha_c$. Another loss is absorption in the material which is remarkably increased under the applied electric field (caused by electrode activation) required in changing its refractive index. This absorption loss is denoted by $\alpha_a$. Absorption loss in the bulk Lithium Niobate is fortunately small (being less than 0.1 dB/cm) but, when the material is under applied electric field, absorption losses are increased. FIG. 10 shows the coupling loss $\alpha_c$ and the summation loss $\alpha_s$ versus the angle of incidence $\theta_i$ with the voltage induced refractive index change $\Delta_v$ taken as the parameter where $\alpha_s$ is defined as the summation of reflection, coupling and absorption losses $\alpha_s = \alpha_r + \alpha_c + \alpha_a$ and in order to be on the safe side, absorption loss is overestimated to be $\alpha_a = 1$ dB/cm. As seen, both $\alpha_s$ and $\alpha_c$ increase very rapidly when $\theta_i$ is increased which is quite expected because of the increased contribution from the plane wave components failing to undertake total reflections. The interesting point is that as a result of introduction of the REABEL into the switch configuration, the total losses become acceptably low. For example, the summation of losses becomes $\alpha_s \sim 0.9$ dB at a small voltage induced refractive index change of only $\Delta_v = 0.00015$, when the angle of incidence is designed to be $\theta_i = 1.0°$ corresponding to $\theta = 2°$. These results indicate the capability of the REABEL configuration in reducing the losses to acceptably low values even at small voltage induced refractive index changes realizable in a low loss electro-optic material such as Lithium Niobate. This achievement will in turn allow switching operation based on Pockels phenomenon which is a high-speed process that brings about the possibility of realization of very fast optical switches.

Figure 11:
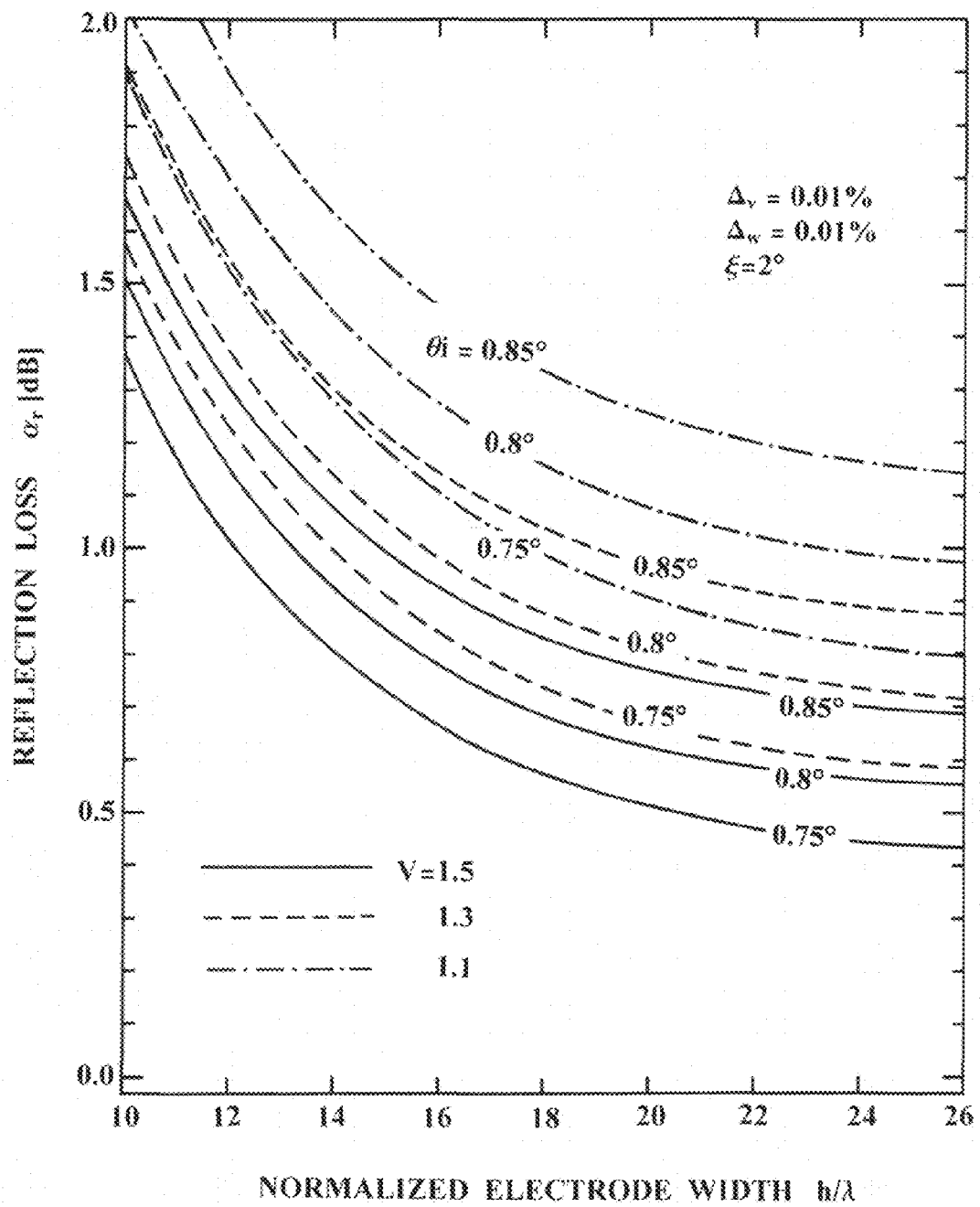
FIG. 11 is a graph illustrating relationships between normalized electrode widths and reflection losses.

Having been able to suppress summation loss as to acceptably low values, by introduction of the REABEL configuration, the question that arises is what is the required width of such an electrode? As the answer, the required electrode width h (normalized to the wavelength λ) in relation to the reflection loss $\alpha_r$ is shown in FIG. 11 where the angle of incidence $\theta_i$ and the normalized wavelength V of the guided mode are taken as parameters. The normalized wavelength is taken to be in the range V=1.1~1.5 where single mode operation is assured. As seen, in all cases, reflection loss $\alpha_r$ is reduced when h/λ is increased. The reason is that the wider the REABEL, the better the reflection quality of the 3 layer structure (described above) created due to electrode activation. The other interesting trend is seen to be the increase in $\alpha_r$ when V is reduced. The reason is that when V is reduced, the propagation constant of the guided mode is also reduced resulting in a smaller equivalent refractive index n(φ) shown in FIG. 21 from which the guided mode is to be reflected (discussed hereinafter). The important conclusion is that the reduction in reflection loss stops at h/λ~25 beyond which further increase of the REABEL width h would not cause any further loss reduction. In other words, the width of the REABEL must be designed to be larger than about 25 light wavelengths. Fortunately, variations in $\alpha_r$ are very slow beyond h/λ~15 so that reflection losses would not dramatically increase even if the width of the REABEL is taken into this vicinity. This is of practical importance because the ultimate limitation of switching speed is determined by the parasitic capacitance of the device which is improved once the REABEL area is reduced.

Figure 12:
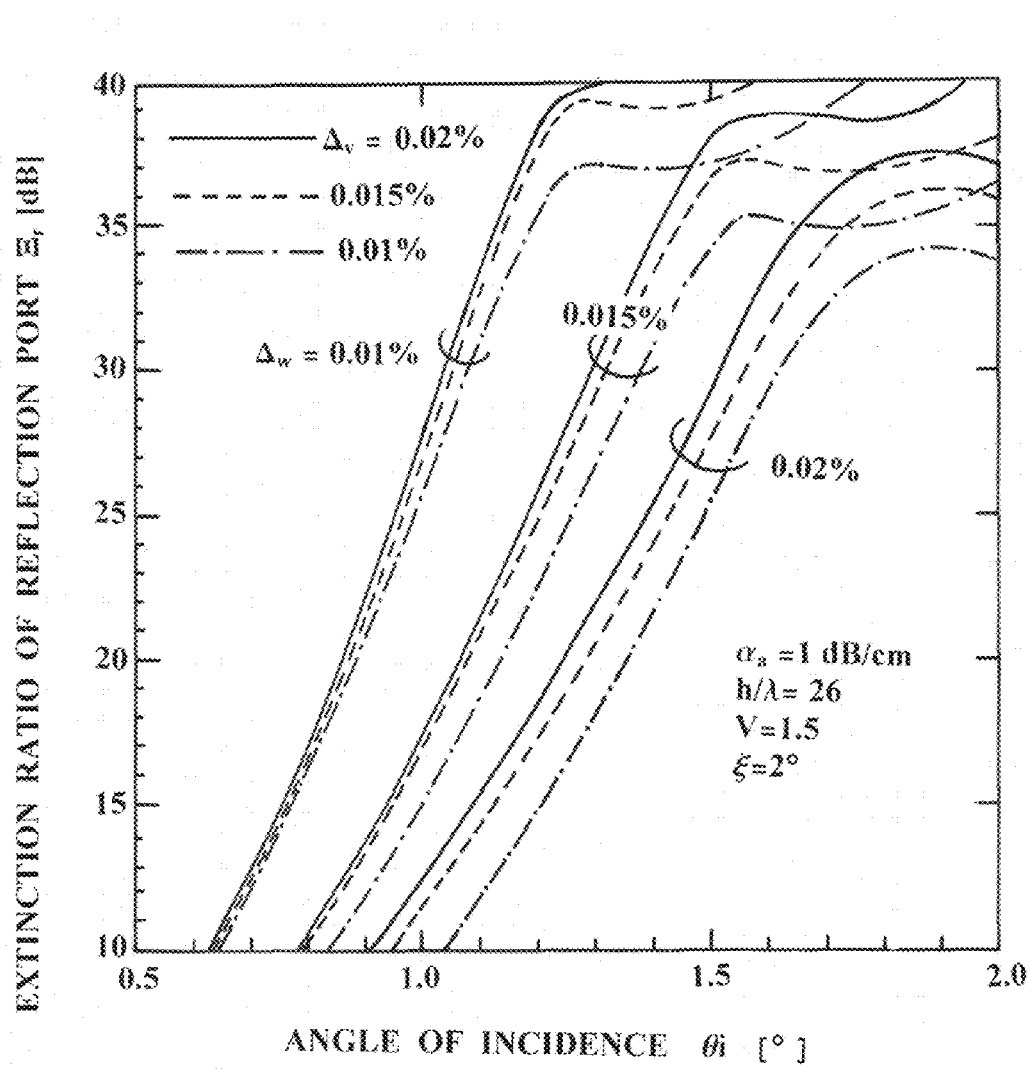
FIG. 12 is a graph illustrating relationships between extinction ratios of reflection port and angles of incidence.

The ratio of optical powers appearing at the reflection port under a voltage applied to the REABEL (i.e. an activated REABEL) and in an absence of voltage applied thereto is defined to be the extinction ratio of the reflection state shown by $\Xi_r$. This is the most important characteristic of this switch state and is determined for the REABEL with the results depicted in FIG. 12 where $\Xi_r$ (expressed in dB) is plotted against the angle of incidence $\theta_i$ with the waveguide relative refractive index difference $\Delta_w$ and voltage induced relative refractive index change $\Delta_v$ taken as the parameters. As seen, the extinction ratio of the reflection state $\Xi_r$ increases rapidly when the angle of incidence $\theta_i$ is increased. This rapid increase can be explained in terms of the decrease in power coupled to the reflection port when REABEL is not activated and the guided mode propagates to the transmission port. With reference to the summation and reflection losses presented in FIG. 10, it is observed that low loss switching operation can not be achieved at sufficiently high extinction ratios. That is, in the range of small angles of incidence less than about $\theta_i = 1°$ where losses are low, extinction ratios can not be sufficiently large (as they remain <20 dB). On the other hand, at rather large angles of incidence ($\theta_i > 1.5°$ corresponding to $\theta > 3°$) where extinction ratios become acceptably large, losses in turn become intolerably high! This reverse behavior of losses versus extinction ratios is the biggest impediment in realization of fast optical switches as explained above. In this regard, any attempt to achieve both large extinction ratios and low losses at the same time, would succeed only if the voltage induced refractive index change $\Delta_v$ is sacrificed. Such an approach is not in line with the objective of this invention (which is realization of a fast spatial switch requiring $\Delta_v = 0.0001 \sim 0.0002$) and is not practical because of the difficulties in electronic sources capable of voltage delivery in excess of about 10 volts at high frequencies (say at 100 GHz). In overcoming this very serious difficulty, the novel idea of introduction of a second electrode (i.e. the "blocker") is proposed. The blocker 6 is shown in FIGS. 1(a), (b) and (c) and is taken to be wide enough so that an incident guided mode reflects from a boundary between two layers. Blocker widths of about 25 light wavelengths or more are considered to be wide enough and their width plays no role, as stated earlier. The blocker 6 is activated only if there is no voltage applied to REABEL 5. That is, the REABEL 5 and the blocker 6 must be activated alternately, as shown in FIG. 2 and discussed earlier. The alternate activation of these two electrodes brings about the possibility of blocking the penetrated optical power propagating towards the reflection port (due to reflections caused by the blocker activation) when the guided mode is on its propagation path towards the transmission port (see FIG. 1(b)). When the blocker 6 overlying waveguide 3 is activated, a refractive index boundary is created that diverts most of the penetrated plane-wave components away from the reflection port. The diverted components may further undertake total or partial reflections at the core cladding boundaries of waveguide 3 with their ultimate path being insignificant to the extinction ratio. As a result of suppression of such penetrating plane waves, the extinction ratio of the reflection state would improve. A small portion of the penetrated plane waves fail to undertake total reflection and are unavoidably transmitted to the reflection port. Therefore, the extinction ratio would always remain finite but very large.

Figure 13:
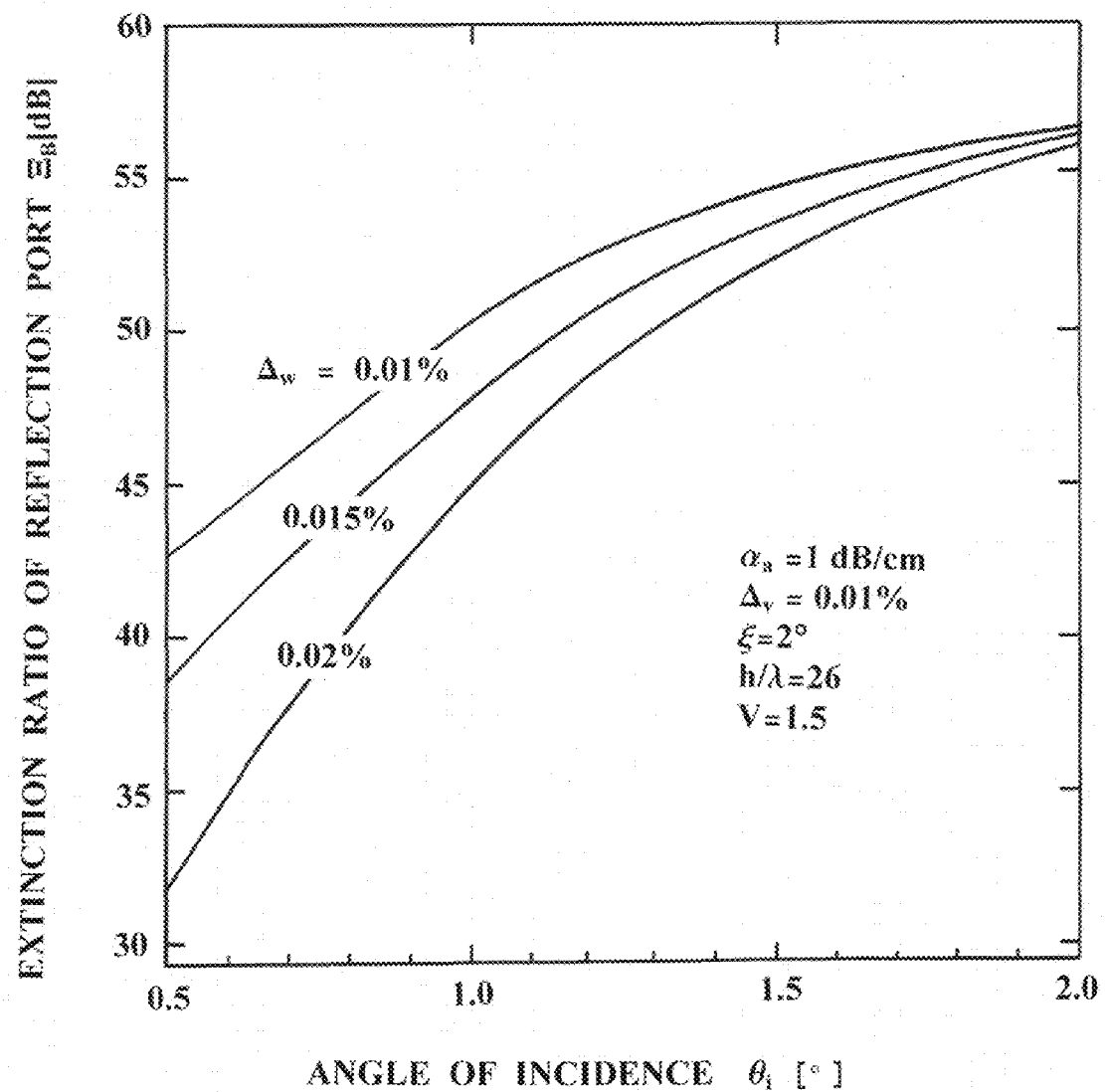
FIG. 13 is a graph illustrating relationships between angles of incidences and improvement of extinction ratios of reflection port.

When this type blocker is introduced into the switch (see FIGS. 1(a), (b) and (c)), the extinction ratio of the reflection state $\Xi_B$ versus the angle of incidence $\theta_i$ with the waveguide refractive index difference $\Delta_w$ taken as the parameter, is shown in FIG. 13. As seen, quite high extinction ratios of $\Xi_B \sim 50$ dB become achievable at $\theta_i \sim 1°$, even under a small $\Delta_v = 0.0001$. It is, therefore, claimed that introduction of the blocker (i.e. the second electrode) is very potent in improving the extinction ratio of the reflection state.

Figure 14:
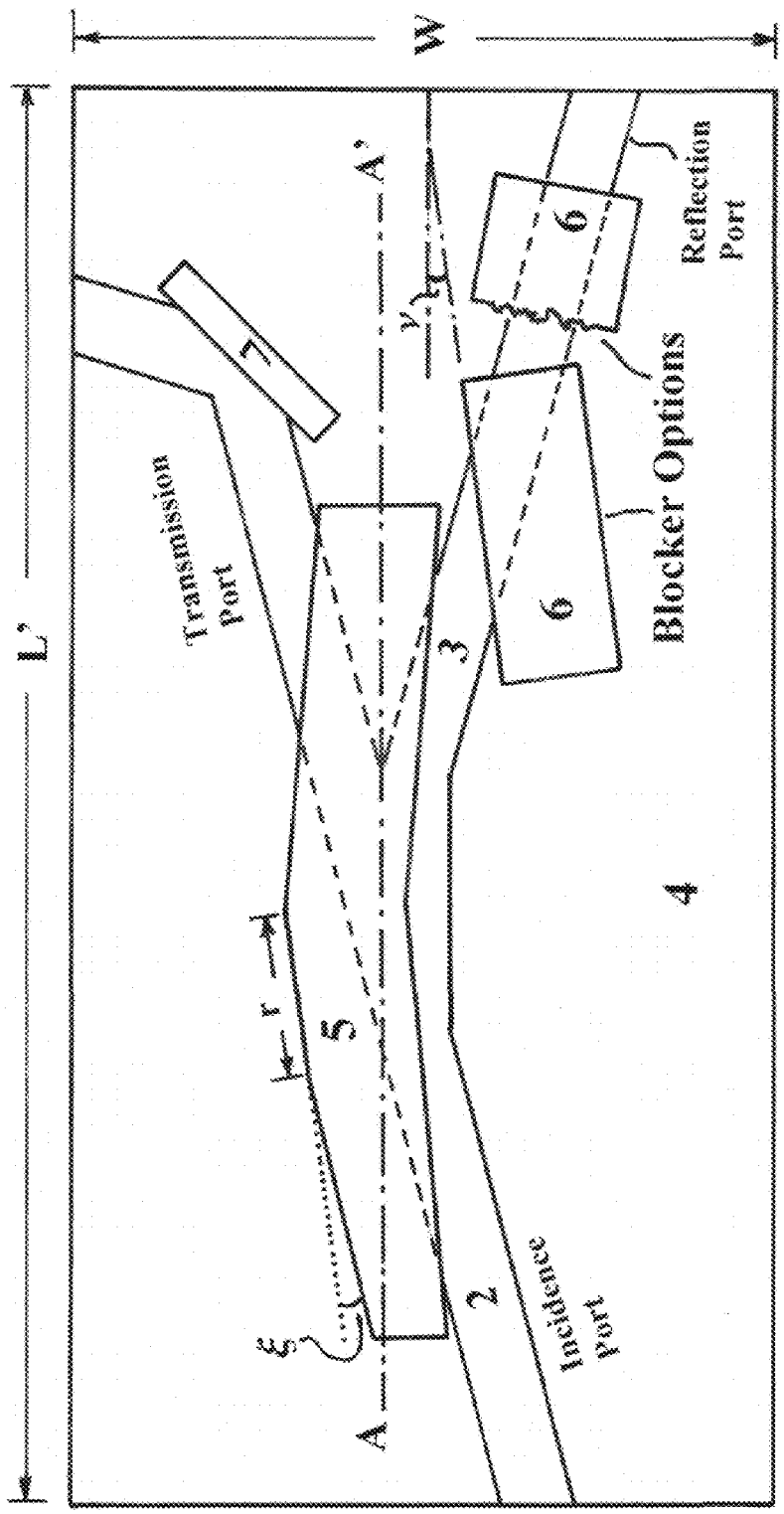
FIG. 14 is a top illustration of an embodiment of my new optical switch showing different blocker configurations.

Having been successful in boosting up the extinction ratio of the reflection state by introduction of a blocker, it is noted that the angle of inclination of the blocker η (with respect to the reference axis A-A') overlying waveguide 3 is very small resulting in remarkable elongation of the switch. The requirement for small angle η is because the activated blocker is used to totally reflect the incident penetrated guided mode when the REABEL is not activated. This elongation can be avoided by configuring the blocker in the opposite direction where the requirement turns to be in the form of a small angle υ, as shown in FIG. 14. Alternatively, a short blocker laid at an arbitrary angle could be used but its front edge facing the incoming penetrated guided mode needs to have wavelength size regular and/or irregular corrugations. These possible blocker configurations are shown in FIG. 14. Introduction of wavelength-size corrugations will effectively scatter the incident light away from the reflection port resulting in improved extinction ratio $\Xi_B$. With such blockers, the switch length L' shown in FIG. 14, becomes slightly longer than half of the switch length L in FIG. 3(b).

VI-C: Transmission State

Figure 15:
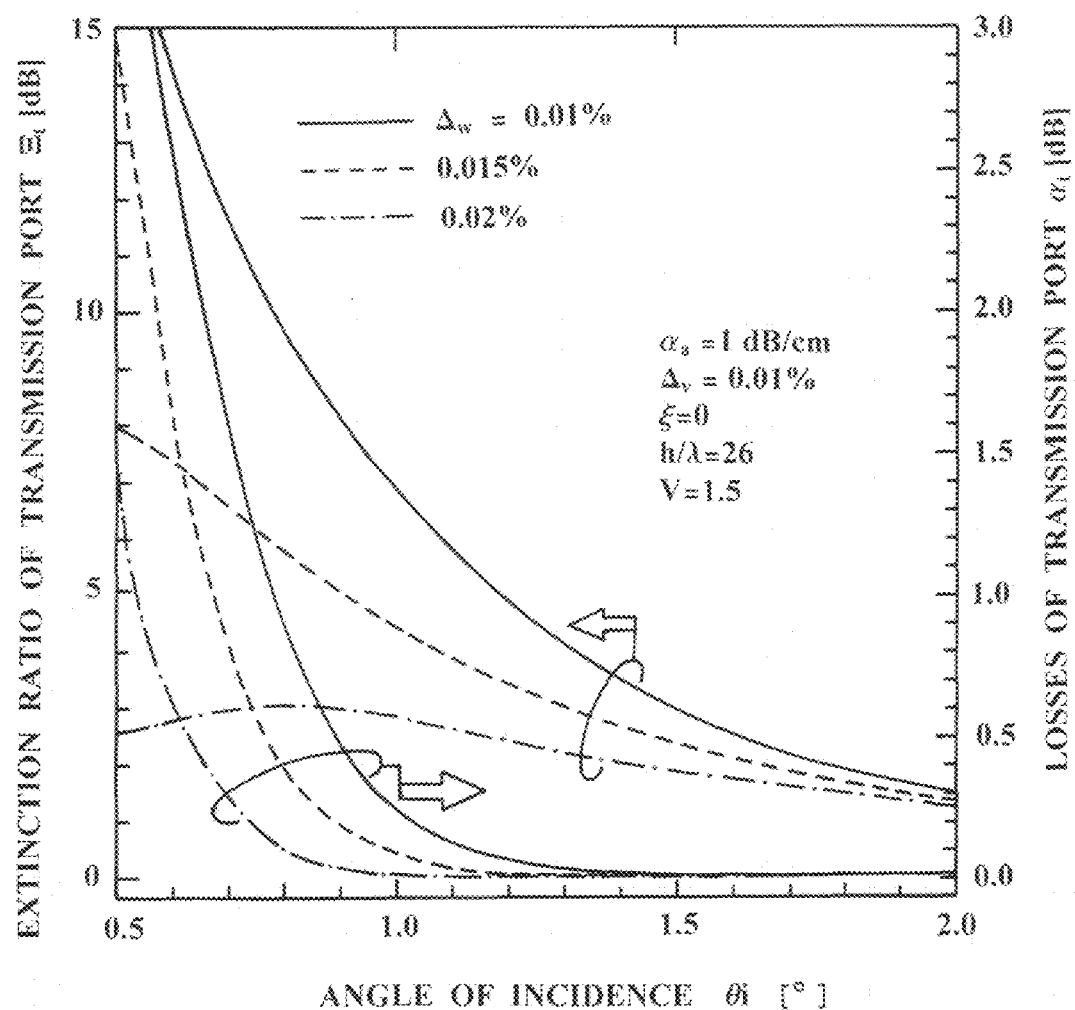
FIG. 15 is a graph illustrating extinction ratios of transmission port and losses thereof in relation to angles of incidence.

When REABEL 5 is not activated (see FIGS. 1(a) and (b)), the switch is in its transmission state and the incident guided mode propagates directly along $Z_i$ in waveguide 2. In this state, there are no additional material absorptions as REABEL 5 is not activated. FIG. 15 shows the transmission loss and extinction ratio of the transmission state $\alpha_t$ and $\Xi_t$ versus the angle of incidence $\theta_i$ with the waveguide relative refractive index difference $\Delta_w$ taken as the parameter. As seen, the transmission loss $\alpha_t$ decreases very rapidly when the angle of incidence $\theta_i$ is increased. This is an interesting result and is interpreted in terms of reduced power penetrated into the reflection port resulting in a great portion of optical power in propagation toward the transmission port. The transmission loss $\alpha_t$ is less than 0.3 dB even at $\Delta_v$=0.0001 and at rather wide plane wave spectrum of $\Delta_w$=0.0002 (see FIG. 6). As stated earlier, because of the absence of the voltage induced absorption loss and lack of phase disturbances (associated with total reflection process) resulting in improved coupling efficiency of the transmitted light to the eigen mode, the overall loss $\alpha_t$ is very low.

In regards to the extinction ratio of the transmission state $\Xi_t$ (scaled on the left vertical axis), the results are very disappointing as there is no rear edge adjustment at $\xi$=0. As the extinction ratios are $\Xi_t$<10 dB, the switch is rendered useless. The situation is very tight and, again, any attempt in improving $\Xi_t$ would seriously degrade the excellent switching characteristics achieved so far.

Figure 16:
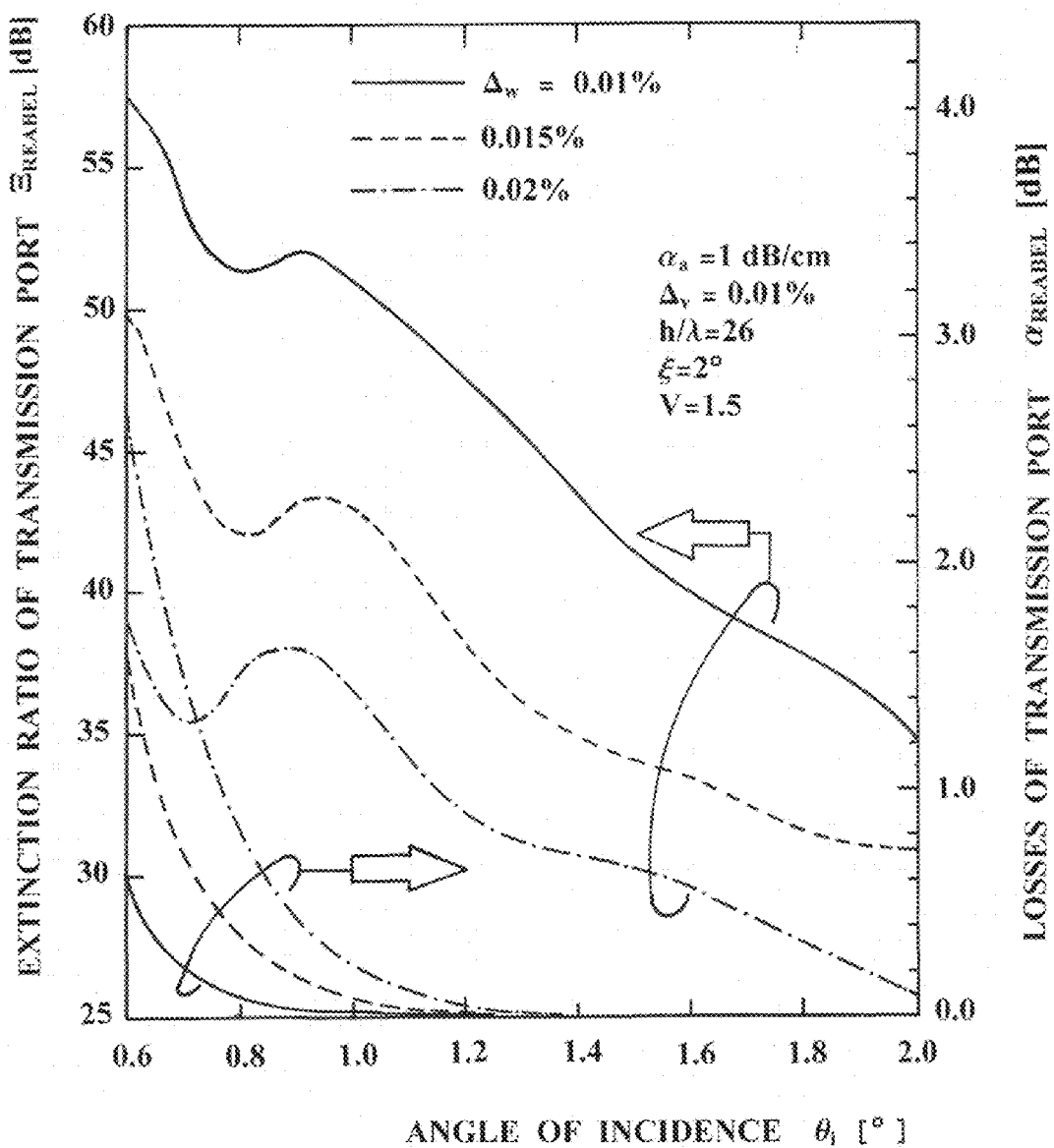
FIG. 16 is a graph illustrating improved extinction ratios and losses at transmission port in relation to angles of incidence.
Figure 17:
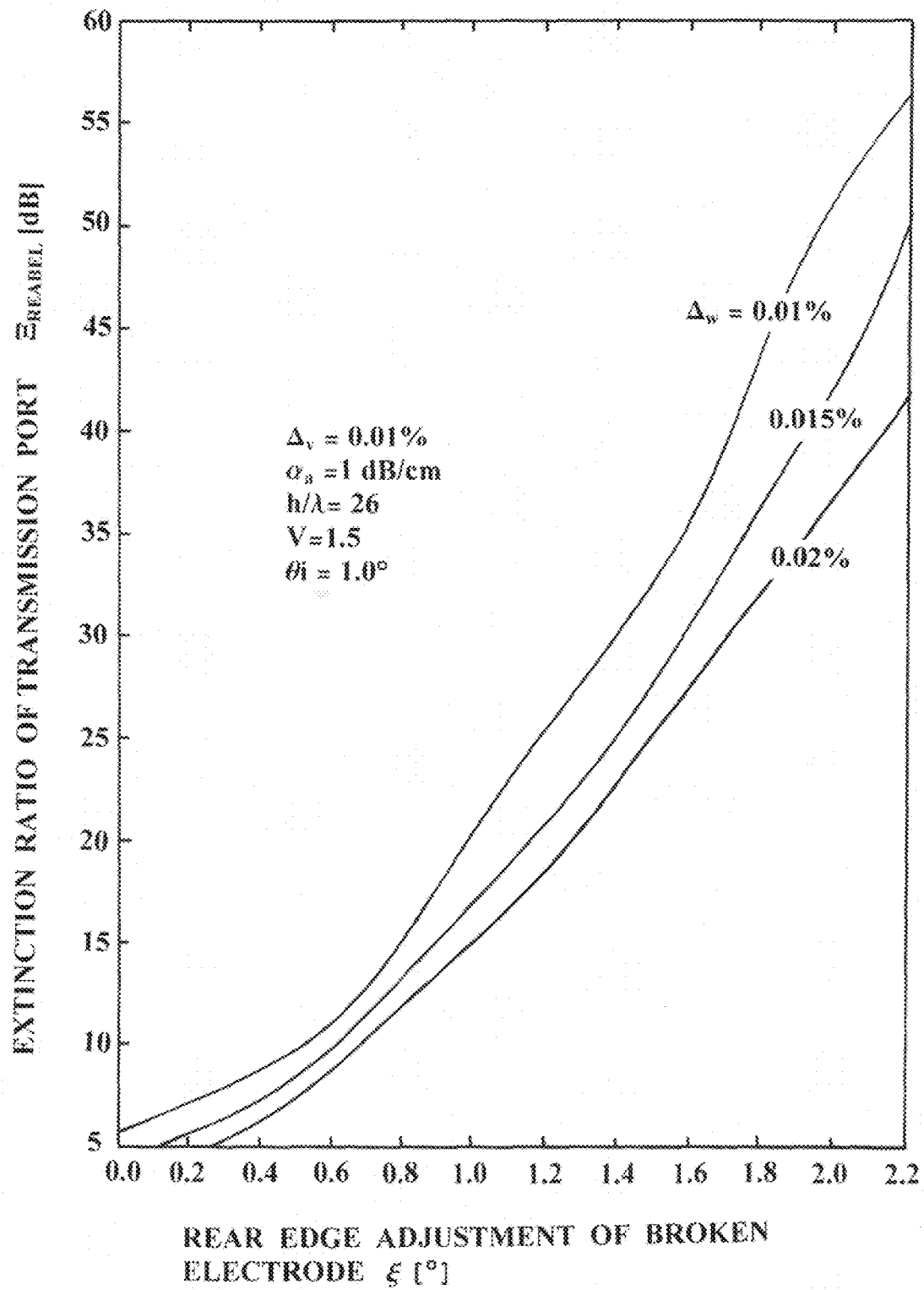
FIG. 17 is a graph illustrating relationships between rear edge adjustment of Applicant's broken electrode configuration and extinction ratios of transmission port.

For overcoming this last but not least impediment, the rear edge adjustment of the broken electrode is applied. As shown in FIGS. 1(a) and (b), the broken electrode 5 is made to maintain its constant width h (investigated in FIG. 11) over its right portion but only up to position r (determined later hereinafter) in its left portion from where it starts to linearly decrease in width as its left far end is approached. This decreasing width is denoted by h'. The decrease in width is due to the inclination of the rear edge of the broken electrode at angle $\xi$ as shown in FIG. 1(b). The mechanism of extinction ratio improvement brought about by such rear edge inclination, is described below. In the three layer structure with two boundaries (described above) created when the electrode 5 is activated, most components of the plane wave spectrum incident on the front boundary, are totally reflected and coupled to the waveguide 3 of reflection port. Some components, however, penetrate into the middle layer and propagate to the rear boundary where some are reflected back into this middle layer leaving a small portion transmitted to the third layer. This last transmitted power is responsible for the unacceptably low extinction ratio $\Xi_t$. Inclination adjustment of the rear edge of the broken electrode (and consequently, the rear boundary), suppresses the transmitted portion to the third layer by increasing up reflections back into the middle layer. Out of these reflections back into the middle layer, a portion is transmitted to the first layer through the front boundary and as a result, the overall reflectivity of the three layer structure is improved. The result of mathematical treatment of this novel configuration of a Rear Edge Adjusted Broken ELectrode (REABEL) is presented in section XIV. FIG. 16 shows the transmission state extinction ratio of REABEL structure $\Xi_{REABEL}$ against the angle of incidence $\theta_i$ with the waveguide relative refractive index difference $\Delta_w$ taken as the parameter. It is noted that, as the consequences of rear edge adjustment (i.e., $\xi$=2°), the transmission loss $\alpha_{REABEL}$ (right vertical scale), has improved quite remarkably. This is the consequence of improved overall reflection capability of the REABEL configuration. The ultimate success in improving the extinction ratio of the transmission state is clearly observed. For example, extinction ratio turns to be $\Xi_{REABEL}$>50 dB at $\theta_i$=1° and $\Delta_w$=0.0001 when the rear edge is adjusted at $\xi$=2°. A more concrete evidence of the effectiveness of the REABEL structure in improving the extinction ratio is presented in FIG. 17 where $\Xi_{REABEL}$ is plotted against the inclination angle $\xi$ with the waveguide refractive index difference $\Delta_w$ taken as the parameter. As seen, the improvement in $\Xi_{REABEL}$ is quite drastic when $\xi$ is increased. These explanations of the physical phenomenon together with the end result of the mathematical solution of REABEL structure (presented in section XIV) prove that the REABEL configuration is capable of increasing the extinction ratio and decreasing the losses of optical switches.

Cross Talk

Figure 18:
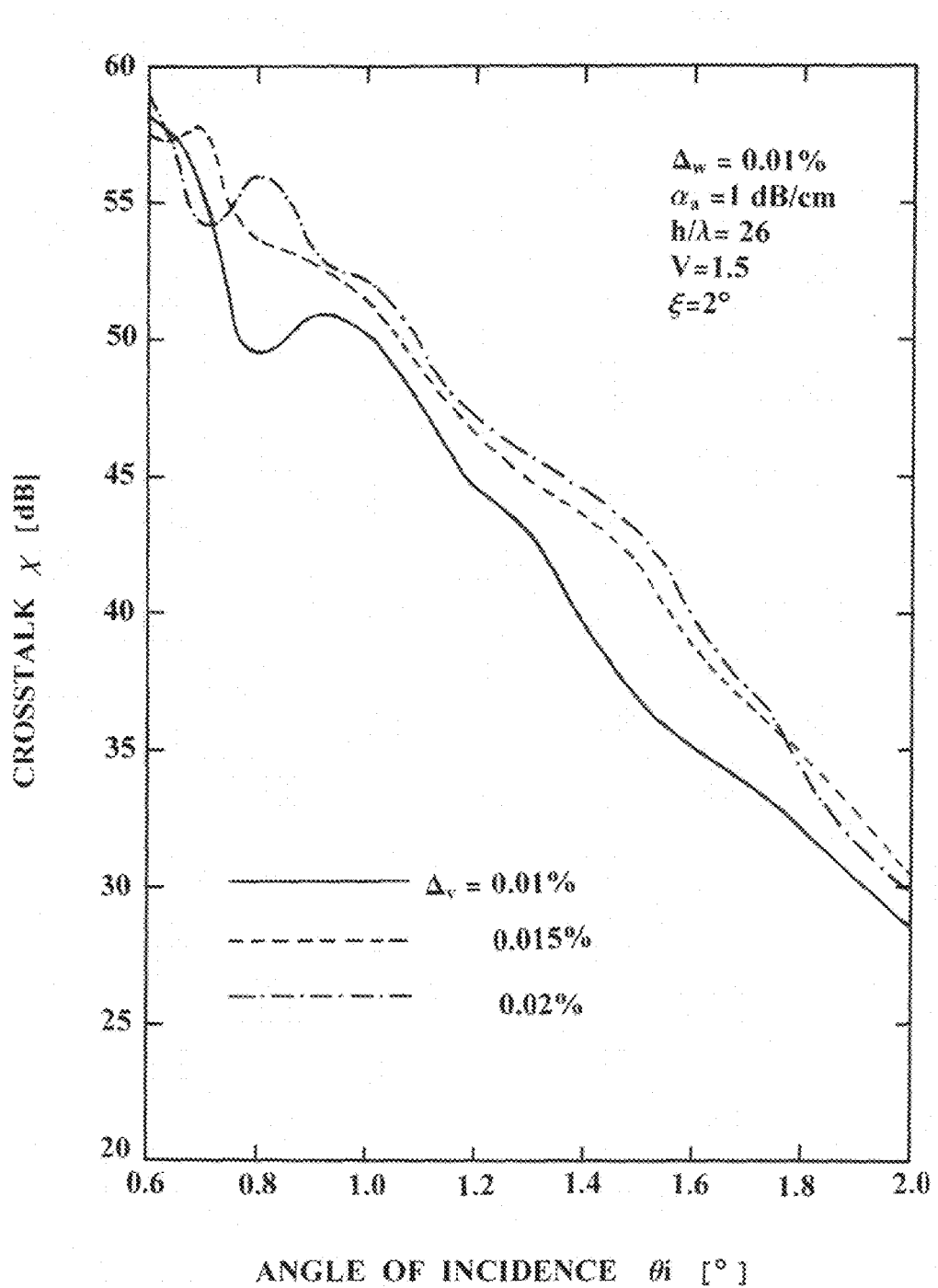
FIG. 18 is a graph illustrating relationships between angle of incidence and crosstalk.

Cross talk, defined as the ratio of reflected to transmitted power when the REABEL 5 is activated, plays an important role in switching characteristics (denoted by $\chi$). The switch can find applications in optical communication systems and networks only if $\chi$ is sufficiently large, and system designers would only be satisfied with cross talks in excess of about 30 or even 40 dB. FIG. 18 shows the cross talk $\chi$ of the REABEL switch versus the angle of incidence $\theta_i$ with the voltage induced refractive index difference $\Delta_v$ taken as the parameter. As the reflection process deteriorates with an increase in the angle of incidence $\theta_i$, more plane wave components find their path to the transmission port resulting in degradation of the cross talk $\chi$. At around $\theta_i$=1° (corresponding to $\theta$=2°), quite high cross talks of $\chi$~50 dB are achievable. Again, as the consequence of the introduction of REABEL configuration into the switch structure, a very high cross talk is achieved. This is confirmed by comparison of cross talks in switches with and without rear edge adjustment of the broken electrode.

Air Groove

When REABEL 5 in not activated, the incident guided mode propagates directly along $Z_i$ to the transmission port (see FIG. 1(b)) and as shown in section VI-C, this state maintains its low loss and high extinction properties as the guided mode does not undertake any reflection process. If the propagation length along $Z_i$ is sufficiently long, even the decaying portion of the optical field penetrated into the waveguide cladding (shown in FIG. 1(b)) becomes separated from the waveguide of the reflection port. That is, the two waveguides of reflection and transmission ports become isolated and their mutual coupling becomes negligible. This requires that the two waveguides 2 and 3 inclined at θ with respect to each other be long enough so that their separation 's' becomes equal or larger than twice the size of the decaying optical field in the cladding region. Under such circumstances, an air groove 7 of length l and width w is provided in the substrate (from the beginning of switch fabrication explained in Section II), as shown in FIGS. 1(a), (b) and (c). Its depth into the substrate material (denoted by d in FIG. 1(c)), must also be equal or greater than the vertical size of the optical field. The air groove is made to totally reflect the incident guided mode to that along $Z_d$. The air groove is required to be inclined such that the entire plane wave spectrum undertakes total reflection. That is, provision of an air groove with a proper inclination angle would result in an almost loss-free total reflection of the transmitted mode, following its successful separation from the reflection mode. This would substantially increase light deflection capability of the switch. The inclination of the air groove (with respect to the reference axis A-A') denoted by Ω (shown in FIG. 1(b)) must be such that the angle of incidence of all plane wave components of the guided mode remains larger than the critical complementary angle. This requires the allowance for a marginal angle $θ_m$ to allow total reflection of the entire spectrum of plane waves as shown in FIG. 6. At the Lithium Niobate-air boundary with refractive indices of 2.22 and 1.0 (corresponding to the relative refractive index difference of Δ=39.85%, the critical complementary angle is 26.78°.

Figure 19:
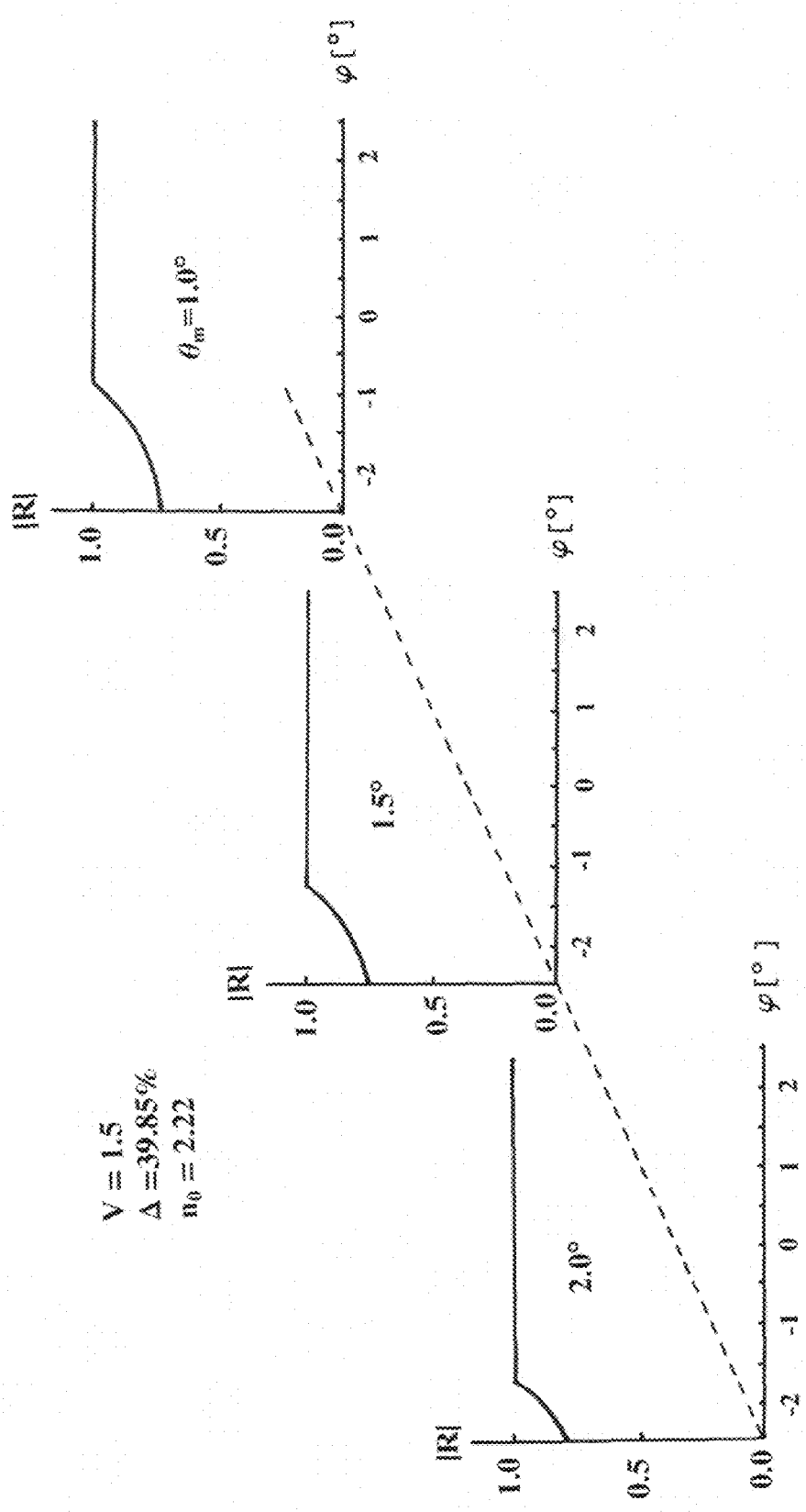
FIG. 19 shows required marginal angle of air groove inclination in achieving total reflection.

The power reflectivity |r| of the air groove versus the angle of propagation φ of the plane wave components (depicted in FIG. 6) is shown in FIG. 19 where the marginal angle $θ_m$ is taken as the parameter. As seen, the region of unity power reflectivity extends to the left allowing for total reflection of plane wave components with a negative φ. Under conditions of the guided mode expressed as V~1.5 and $Δ_w$~0.0001, the spectrum width would extend from φ~−2° to φ~+2° (see also the spectrum shown in FIG. 21). Therefore a marginal angle $θ_m$ of ~2° would suffice to let the entire spectrum of the guided mode plane wave components to be totally reflected upon incidence at the air groove. That is, inclination of the air groove would be Ω~60° including the required margin angle. Instead, the inclination of the air groove angle is chosen to be only Ω=45° in the instant switch. With this choice of the air groove angle, the transmission and reflection ports become mutually perpendicular as their respective waveguides 2 and 3 are at a right angle. As such, integration of a large number of switches (in formation of a switch matrix) would be greatly facilitated. In fact the perpendicularity of the switch states brings about the possibility of two-dimensional integration where a large number of switch elements can be integrated in a small area. Since angles such as $θ_i$, θ, $θ_w$ are all small (about 1°), one switch element may be about 5 mm long while its width is only about a few tens of micrometers. The ability of two-dimensional integration is a significant achievement as it allows successive as well as transverse integration of switch elements.

Drive Requirements

The switch of the instant invention was shown to exhibit excellent characteristics at a very small relative refractive index change generated through Pockels effect. Taking the example of a z-cut Lithium Niobate Material where $r_{33}$~32 pm/v and extraordinary refractive index of $n_0$~2.22, at voltage induced refractive index change of $Δ_v$~0.0001 and g~5 micrometers, the required voltage to drive the switch element is about v~6.34 volts which is among lowest values reported in the literature. Defining a figure of merit f of the device as the required switching voltage per angle of light deflection, it turns out that the instant switch achieves f~0.07 v/°.

Redacted

Single Electrode Operation of 1×2 Switch

Figure 20A:
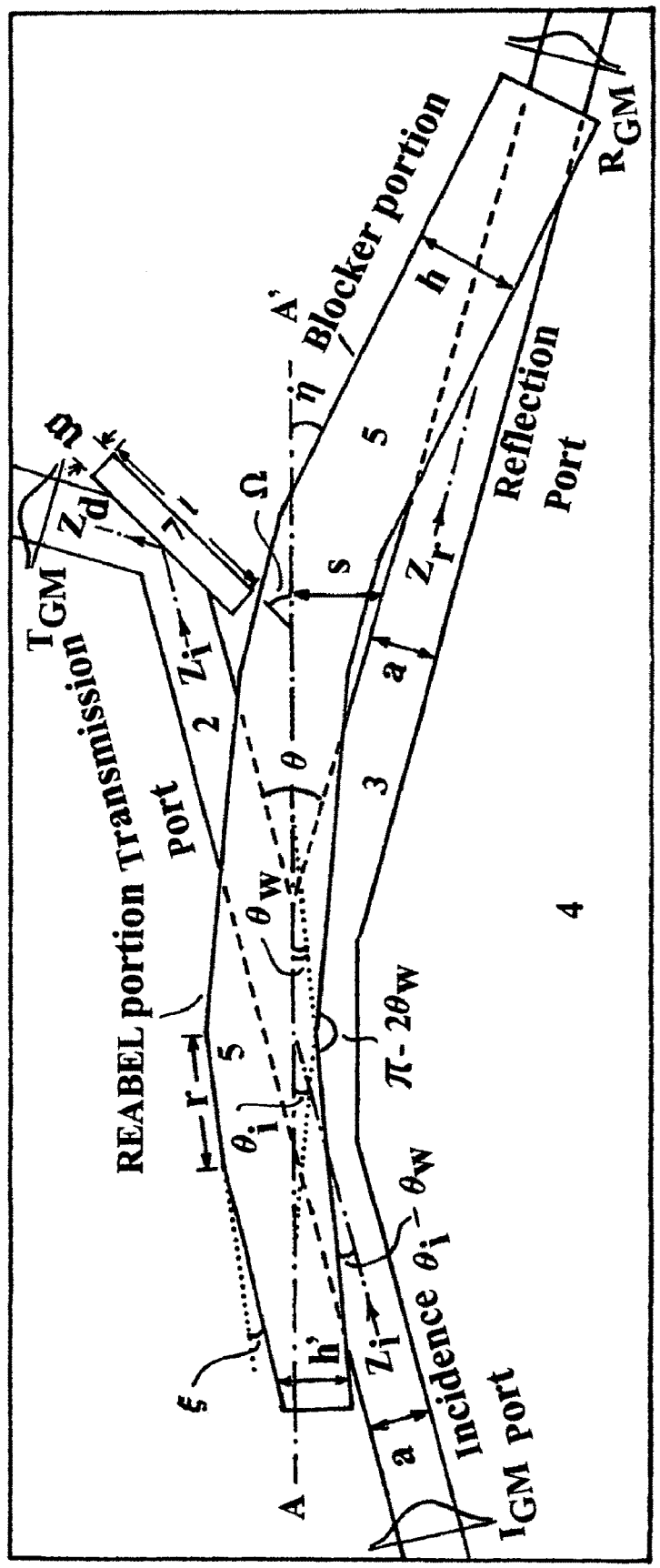
FIG. 20(a) is a top view of structural details of single electrode operation as another embodiment of my new optical switch.

In Section VI-B, the idea of introduction of a blocker (i.e., the second electrode) was presented and its effectiveness in improving the extinction ratio $Ξ_B$ was confirmed (see FIG. 13). The drive requirement in terms of alternate activation of the REABEL and the blocker was also described (see FIG. 2). Remembering that high speed switching is achievable based on Pockels electro-optic effect, it would be possible to connect the two electrodes as shown in FIGS. 20(a) and (b) to form a single electrode 5 and have it activated from its left end. In this single electrode switch shown in FIG. 20(a), the ground electrode is taken, for example, to be exactly the image of the electrode 5 and positioned at the bottom of the substrate to allow vertical field application to optical waveguides as shown by ground electrode 8 in FIG. 20(b). The switching operation can be achieved by adjusting the transit time of voltage pulses, as by buffer-layer thickness and/or electrode-length, of the traveling signal activation along the connected single electrode. That is, when the voltage signal is in propagation through the REABEL portion of the connected electrodes, the optical guided mode would be in reflection state. As the activation reaches the blocker portion, the optical guided mode would be switched to the transmission state. This means that the propagating electronic signal used in activation of the single electrode acts as a gate and opens the reflection and transmission ports, respectively, as the pulse propagates down the length of electrode 5. Such propagation of the pulse along the connected electrodes develops a corresponding propagating electric field through waveguides 2 and 3 that in turn causes a refractive index change first in waveguide 2 to reflect incident guided mode to the reflection port, and subsequently a refractive index change in waveguide 3 (together with restoration of refractive index in waveguide 2) to send the guided mode to the transmission port as the activating signal moves from left to right. The requirement is that the phase velocities of the activation signal propagating down the connected electrode and the guided mode need to be matched [27]. As the refractive index of $SiO_2$ buffer layer 4 lies between those at the optical and millimeter wave frequencies, adjustment of buffer layer thickness would help achieving the required velocity matching. This capability of light switching by a single electrode is a significant achievement as it simplifies the electrode design and the switch operation.

Single Electrode Operation of 2×2 Switches

Even in case of a 2×2 spatial switch (see FIG. 3(b)), it would be possible to connect the REABEL 5 to B and further to B'. The transit time delay from B to B' must also be adjusted such that activating voltages applied to the three electrodes satisfy requirements shown in FIG. 4 which may require for introduction of electronic delay lines.

Analytical Procedure

The guided fundamental mode in a waveguide of width a, normalized frequency V and waveguide relative refractive index difference $Δ_w$ is oscillatory inside the core of the waveguide with oscillation constant γ and decay type in the cladding region with decay constant σ. Its plane wave spectrum F(φ) is given as [22]:

$$F(\phi)=(a/2)\{\{[\sin(V\sin\phi/(2\Delta_w)^{1/2}+\gamma a/2)]/[V\sin\phi/(2\Delta_w)^{1/2}+\gamma a/2]\}+\{[\sin(V\sin\phi(2\Delta_w)^{1/2}-\gamma a/2)]/[V\sin\phi(2\Delta_w)^{1/2}-\gamma a/2]\}+2\cos(\gamma a/2)\{[(1/(\sigma a/2)\cos[V\sin\phi/(2\Delta_w)^{1/2}]-V\sin\phi\sin[V\sin\phi(2\Delta_w)^{1/2}]/((2\Delta)^{1/2}(\sigma a/2)^2)\}/\{1+[V\sin\phi((2\Delta_w)^{1/2}(\sigma a/2))]^2\}\}$$

Figure 21:
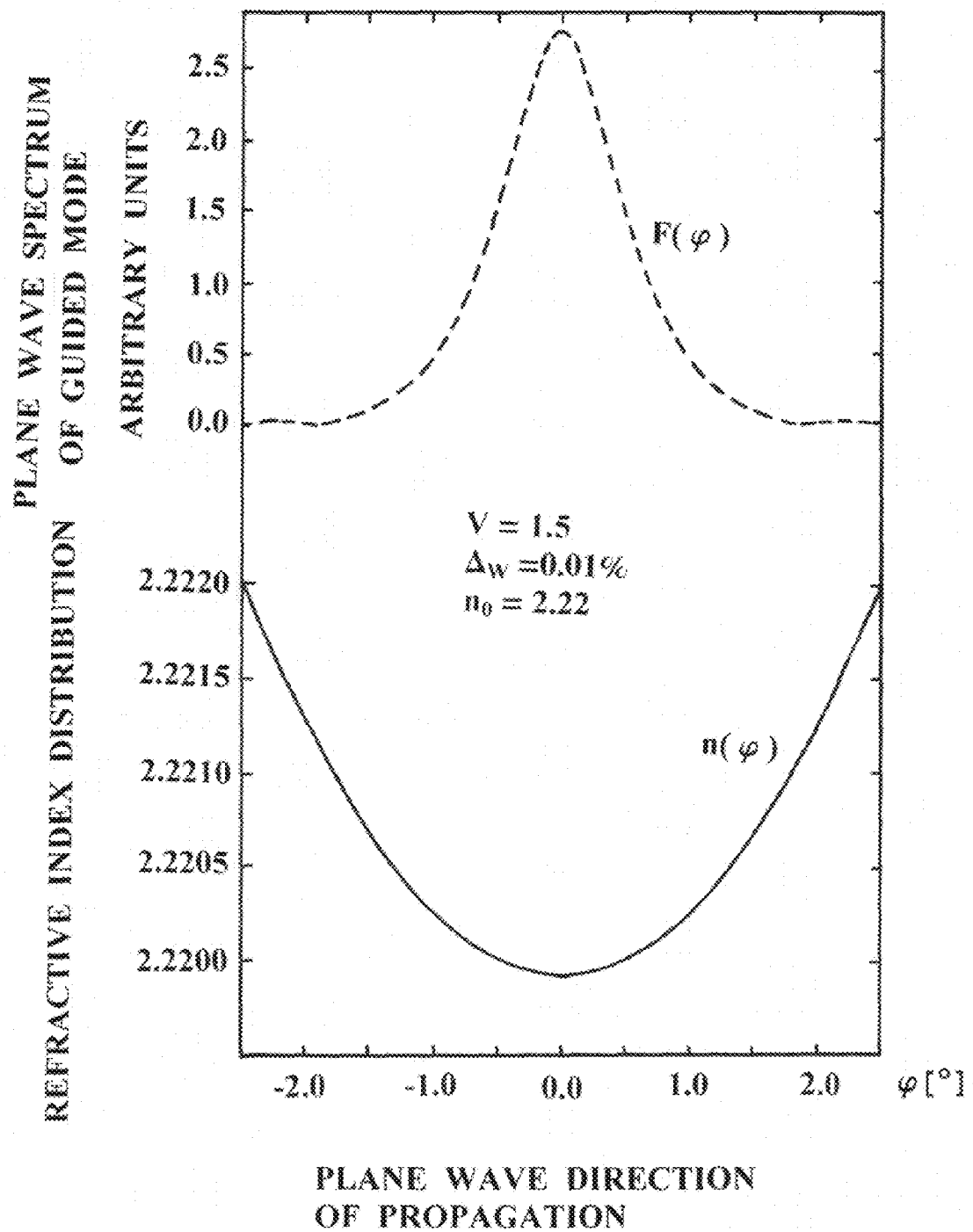
FIG. 21 illustrates angular spectra of an optical guided mode and equivalent refractive index distribution of a non-uniform medium.

(12)

where φ denotes the angle with respect to the direction of propagation of the guided mode shown in FIG. 6 and is taken positive (negative) in the counterclockwise (clockwise) direction. When such a continuum of plane waves is incident on the boundary (of relative refractive index change $\Delta_v$) created because of application of voltage to the electro-optic material, it would be permissible to apply Snell's laws to find the reflection and transmission coefficients. The commonly followed procedure is to take the continuum of plane waves to propagate in a material of uniform refractive index (equal to that of the core material). This procedure is a good approximation when the refractive index difference of the core and cladding materials is very small. There is, however, a very important point in this regard as explained here. When the medium through which the plane waves propagate is taken to be uniform, it induces wave divergence with the inability in retrieving the original guided mode profile after its propagation along a non-zero length. The question that usually arises is the choice of the plane across which the guided mode is replaced by its plane wave spectrum. To overcome these difficulties, the above mentioned uniform material is avoided. Instead, plane waves are taken to propagate in a non-uniform material expressed as [25]:

$$n(\phi) = [(n_0 \sin \phi)^2 + (\beta/k_0)^2]^{1/2} \quad (13)$$

where $k_0$ shows the wave number in vacuum, $n_0$ denotes the core refractive index and $\beta$ stands for propagation constant. With this non-uniform material, the choice of the plane used in expansion of the guided mode into its plane wave constituents, becomes immaterial and the original guided mode can always be retrieved after propagation paths of arbitrary length. Refractive index variations $n(\phi)$ of a typical guided mode is shown in FIG. 21. This is a powerful method in the design of these switches achieved at a high sacrifice in the refractive index difference across the boundary, as shown in FIG. 21. The central refractive index used in total reflection is only $n(\phi=0)=2.21992$ instead of $n_0=2.22000$ taken in the first place. Yet, the switch can operate at very low refractive index change in the range $\Delta_v=0.0001 \sim 0.0002$. This great achievement is the result of the introduction of the REABEL configuration, provision of the second electrode and inclusion of the air-groove. With formulation of the plane wave spectrum of the guided mode and the non uniform material of refractive index $n(\phi)$ expressed in Equations 12 and 13, one can follow the procedure presented in [22] to find switching characteristics such as, reflection and transmission losses, extinction ratios, cross talk, etc.

Analysis of Rear Edge Adjusted Boundary

Figure 22:
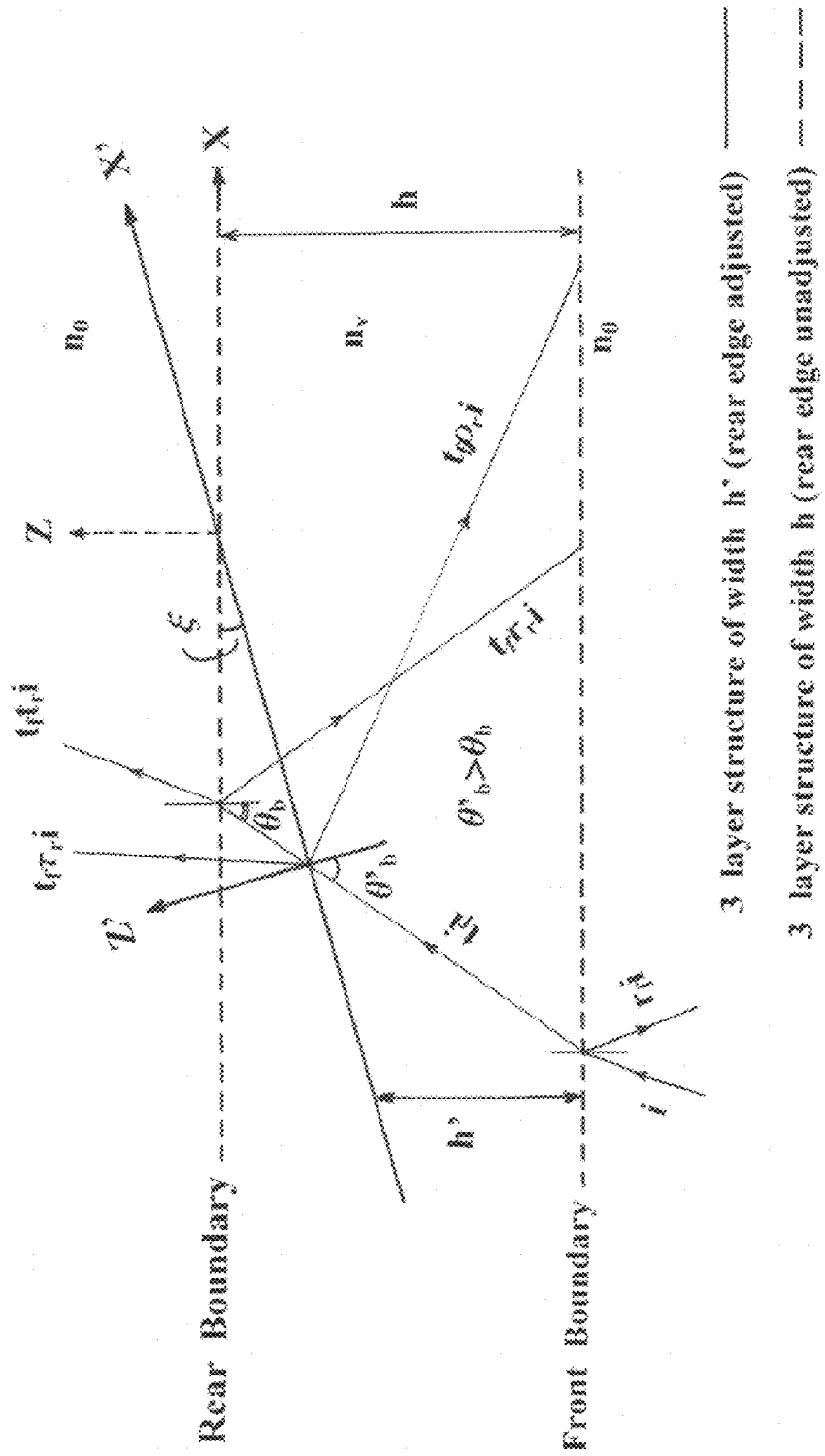
FIG. 22 shows rear edge inclination adjustment of a symmetrical three layer structure.

Reflection and transmission properties of thin optical films have been thoroughly investigated with the results documented in the literature [26]. In such films, the front and rear edges are parallel, as shown by broken lines in FIG. 22. The boundary conditions at the front and rear edges are imposed upon Maxwell's electric and magnetic field equations to obtain the transmission coefficient $\tau$. The result is $$\tau = \{t_f^2 \, t_r^2 \operatorname{Exp}[-jhk_{2x}]\}/\{1 + r_f^2 \, r_r^2 \operatorname{Exp}[-jhk_{2x}]\} \quad (14)$$

where $r_f, t_f$ and $r_r, t_r$ show the field reflection, transmission coefficients of the front and rear boundaries, respectively and $k_{2x}$ shows the transverse component of the wave vector k in the middle layer with the film width h shown in FIG. 22. Since the boundary conditions need to be applied only to tangential components of electromagnetic fields, those perpendicular to the boundary do not enter into the process. In case of rear edge adjusted film shown in FIG. 22 by a solid line, the projected components on the rear edge play a role. The process of satisfaction of boundary conditions becomes a bit lengthy and here, only the end result of the transmission coefficient $\tau'$ is given as $$\tau' = \{t_f^2 \, \tau_r^2 \operatorname{Exp}[-jh'k_{2x'}]\}/\{1 + r_f^2 \, \rho_r^2 \operatorname{Exp}[-jh'k_{2x'}]\} \quad (15)$$

where the reflection and transmission coefficients of the rear boundary are denoted by $\rho_r$ and $\tau_r$, respectively. The film width h' (which is not constant) replaces h and $k_{2x'}$ shows the transverse component of wave vector k in the tilted x'-z' coordinate system (see FIG. 22). As a result of the rear edge adjustment, it is seen that the angle of incidence (with respect to the normal to the boundary) in the tilted rear boundary is larger than that in the case of the straight (unadjusted) boundary (i.e., $\theta'_b > \theta_b$) and therefore, $$\tau_r < t_r, \rho_r > r_r. \quad (16)$$

It is concluded that $$\tau' < \tau. \quad (17)$$

In other words, the transmission coefficient of the REABEL is smaller than that of a constant width structure. The distance r from where the REABEL width starts to decrease is given by:

$$r = (p+a/2) \cot \theta_i \cos \theta_i \sin(\theta_i - \theta_w - |\phi_1|) \sin \phi / [\cos(\theta_i - |\phi_1|) \sin(\theta_i - \theta_w) \sin(|\phi_1| + \theta_i - \theta_w) \cos \xi] \quad (18)$$

where $\phi_1$ is the extent of the angle in a negative $\phi$ direction of the plane wave spectrum chosen such that the corresponding plane waves undertake reflection by the left portion of the REABEL and $$p = 1/\sigma. \quad (19)$$

Having thus described my invention and the manner of its use, it should be apparent to those skilled in the appropriate arts that incidental changes may be made thereto that fairly fall within the scope of the following appended claims,

Wherein I claim:

1. An optical guided mode spatial switch comprising:
an electrooptic substrate material that exhibits a refractive index change responsive to application of an electric field,
a first optical single mode waveguide in said electrooptic substrate, with a proximal end of said first optical single mode waveguide being an incidence port into which an optical guided fundamental mode is launched, and a distal end of said first optical single mode waveguide further comprising a first output of said switch,
a second optical single mode waveguide in said electrooptic substrate, said second optical single mode waveguide contiguous with and branching from said first optical single mode waveguide at an angle $\theta$, said angle $\theta$ selected according to magnitude of said refractive index change in said first optical single mode waveguide, said second optical single mode waveguide and said electrooptic substrate, with a distal end of said second optical single mode waveguide comprising a second output of said switch,
an axis A-A' equally bisecting said angle $\theta$,
a buffer layer over at least said first optical single mode waveguide and said second optical single mode waveguide,
a first electrode overlying said buffer layer and comprising:
a first portion proximal to said incidence port and having a first front edge overlying said first optical single mode waveguide at a non-zero angle $\theta_W$ with respect to said axis A-A', said first-portion further comprising a first rear edge generally opposed from said first front edge and generally inclined at an angle such that a refractive index boundary under said first rear edge reflects portions of said fundamental guided mode incident at said refractive index boundary under said first rear edge toward said second optical single mode waveguide,
a second portion distal to said first portion and having a second front edge overlying said second optical single mode waveguide at said angle $\theta_W$ with respect to said axis A-A' so that said first front edge and said second front edge intersect over a junction between said first optical single mode waveguide and said second optical single mode waveguide at an angle $\pi-2\theta_W$,
a first refractive index boundary selectively established under said first front edge by a first selectively established electrical field from said first electrode,
a second refractive index boundary selectively established under said second front edge by said first selectively established electrical field, said first refractive index boundary and said second refractive index boundary cooperating to totally reflect said optical guided fundamental mode launched in said first optical single mode waveguide into said second optical single mode waveguide,
a second electrode further comprising:
a third front edge overlying said second optical single mode waveguide and inclined at an angle such that a refractive index boundary under said third front edge directs any of said optical guided fundamental mode away from said second output,
a third refractive index boundary selectively established under said third front edge by a second selectively established electrical field from said second electrode, for directing any of said optical guided fundamental mode away from said second output and into said electrooptic substrate when said optical guided fundamental mode is passing through said first optical single mode waveguide and not being reflected by said first refractive index boundary and said second refractive index boundary,
a ground electrode covering at least portions of a bottom, sides and top of said buffer layer and extending proximate to said first and said second electrodes.

2. An optical switch as set forth in claim 1 wherein said electrooptic substrate material is Lithium Niobate, and said angle $\theta_W$ is about 0.4 degree.

3. An optical switch as set forth in claim 2 wherein said refractive index change yields a relative refractive index change of about 0.0001 to about 0.0002, and said angle $\theta$ is from about 1.0 degrees to about 2.0 degrees.

4. An optical switch as set forth in claim 3 wherein said second portion further comprises a second rear edge opposed from and parallel to said second front edge, with a width between said second front edge and said second rear edge selected to be between about 15-25 wavelengths or more of said optical guided fundamental mode.

5. An optical switch as set forth in claim 3 wherein said first output of said switch further comprises a first air groove through said distal end of said first optical single mode waveguide, said first air groove inclined with respect to said first optical single mode waveguide at an angle selected to totally reflect said first output of said switch in a predetermined direction.

6. An optical switch as set forth in claim 3 wherein orientation of said first output is selected to be perpendicular to said second output.

7. An optical switch as set forth in claim 3 further comprising:
a third optical single mode waveguide in said electrooptic substrate, said third optical single mode waveguide contiguous with said first optical single mode waveguide and said second optical single mode waveguide, and branching from said junction of said first optical single mode waveguide and said second optical single mode waveguide at said angle $\theta$ with respect to said first waveguide to a proximal incidence port into which an optical guided fundamental mode is launched, said third optical single mode waveguide axially aligned with said second optical single mode waveguide, with said axis A-A' equally bisecting said angle $\theta$ between said first optical single mode waveguide and said third optical single mode waveguide,
said first portion of said first electrode further comprising a fourth front edge overlying said third optical single mode waveguide at said non-zero angle $\theta_W$ with respect to said axis A-A' and a second rear edge inclined at an angle such that a refractive index boundary under said second rear edge reflects portions of said fundamental guided mode incident at said refractive index boundary under said second rear edge toward said first optical single mode waveguide,
said second portion further comprising a fifth front edge overlying said first optical single mode waveguide at said non-zero angle $\theta_W$ with respect to said axis A-A' so that said fourth front edge and said fifth front edge intersect over said junction between said third optical single mode waveguide and said first optical single mode waveguide at said angle $\pi-2\theta_W$,
a fourth refractive index boundary selectively established under said fourth front edge by said first selectively established electrical field, and a fifth refractive index boundary selectively established under said fifth front edge by said first selectively established electrical field, said fourth refractive index boundary and said fifth refractive index boundary cooperating to totally reflect said optical guided fundamental mode launched in said third optical single mode waveguide into said first optical single mode waveguide,
a third electrode overlying said first optical single mode waveguide and having a sixth front edge inclined with respect to and traversing said first optical single mode waveguide at an angle such that a refractive index boundary under said sixth front edge directs any of said optical guided fundamental mode away from said first optical single mode waveguide,
a sixth refractive index boundary selectively established under said sixth front edge by a third selectively established electrical field from said third electrode, for directing any of said optical guided fundamental mode away from said first output and into said electrooptic substrate when said optical guided fundamental mode is not being reflected by said fourth refractive index boundary and said fifth refractive index boundary.

8. An optical switch as set forth in claim 7 wherein said second output of said switch comprises a second air groove extending into said second optical single mode waveguide and in reflective relation therewith, said second air groove inclined with respect to said second optical single mode waveguide to reflect said optical guided fundamental mode in a predetermined direction.

9. An optical switch as set forth in claim 3 wherein said first electrode and said second electrode are connected to form a single electrode, with a driving voltage signal applied as a pulse to said proximal end of said first portion, said pulse sequentially propagating from said first portion to said second portion and to connected said second electrode, thereby sequentially and rapidly switching said optical guided fundamental mode between said first output of said switch and said second output of said switch.

10. An optical switch as set forth in claim 9 wherein at least one of a thickness of said buffer layer and a length of said single electrode is selected in order to match a propagation speed of said pulse from said proximal end of said first portion to an opposite end of said connected second electrode with a propagation speed of said optical guided fundamental mode.

11. An optical switch as set forth in claim 3 wherein voltage applied to said first electrode and said second electrode per degree of optical guided fundamental mode deflection is about 0.1 v/°.

12. An optical switch as set forth in claim 3 wherein said third front edge further comprises wavelength-size irregularities, with a resulting said third refractive index boundary under said third front edge being irregular to scatter any incident said optical guided fundamental mode away from said second output when said optical guided fundamental mode is not being reflected to said second output.

13. An optical switch as set forth in claim 1 wherein an extinction ratio at said second output is at least 50 dB when said third refractive index boundary is established.

14. An optical switch as set forth in claim 1 wherein said inclination angle of said first rear edge is selected to suppress optical losses of said first output to less than about 3 dB and improve extinction ratio of said first output to about 45 dB or better.

15. An optical switch as set forth in claim 7 wherein said angle such that a refractive index boundary under said third front edge and said sixth front edge directs any of said optical guided fundamental mode away from said first output and second output is selected to provide a small loss at said first output and said second output and provide a high extinction ratio of about 50 dB or greater for said optical switch.

16. An optical switch as set forth in claim 3 wherein a switching speed of said optical guided fundamental mode between said first output and said second output is up to about 100 GHz.

17. An optical switch as set forth in claim 1 wherein said first output and said second output are directed 180 degrees with respect to each other.

* * * * *